3,135,743
STEROIDO[2.3-d]ISOXAZOLES AND PREPARATION
THEREOF
Raymond O. Clinton, East Greenbush, and Andrew John
Manson, North Greenbush, N.Y., assignors to Sterling
Drug Inc., New York, N.Y., a corporation of Delaware
No Drawing. Filed June 29, 1960, Ser. No. 39,458
32 Claims. (Cl. 260—239.55)

This invention relates to heterocyclic substituted steroids, and in particular it is concerned with steroido[2.3-d]isoxazoles and the preparation thereof.

It has been found that new and useful compounds are produced when an isoxazole ring is fused through its 4- and 5-positions to the 2- and 3-positions, respectively, of a steroid nucleus, said steroid having from seventeen to about twenty-three carbon atoms exclusive of ester radicals.

The ring structure of the compounds of the invention is represented by the following structure:

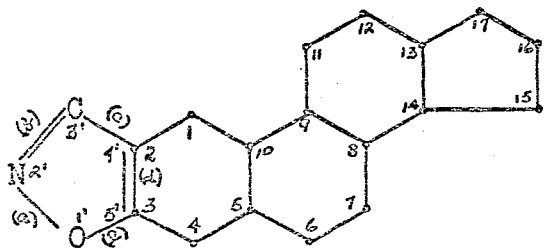

The exact nature of the steroid moiety is not critical, and it can be derived from any steroid of the general type known to exhibit hormonal or other pharmacological or endocrinological properties. Such steroid moieties have from seventeen to about twenty-three carbon atoms, not counting carbon content which may be provided by esterified hydroxy groups. Esterified hydroxy-steroids are included within the scope of the invention, but the carbon content contributed by the acid moiety of the ester is not considered part of the essential carbon content of the steroid.

The steroid moiety can be any member of the estrane, 18-norestrane, androstane, etiocholane, pregnane or allopregnane series. The foregoing can contain varying degrees of unsaturation and a variety of substituents in the form of hydrocarbon radicals or functional groups conventionally employed in the steroid art. Representative of the steroid moieties which make up the compounds of the invention are those having at position 17 a hydroxy, acyloxy, oxo, or both a hydroxy and a lower-alkyl radical, characteristic of the androgenic and anabolic steroids; or a lower-alkenyl, lower-alkynyl, acetyl, hydroxyacetyl, 1,2-dihydroxyethyl, 1-hydroxyethyl, and the like radicals, characteristic of the progestational and adrenal cortical steroids. The steroid moiety can also have one or more substituents at other positions of the nucleus, for example, hydroxy, acyloxy, or oxo radicals at positions 6, 7, 11, 12, 14 or 16; halogen atoms, preferably fluorine, chlorine or bromine, for example, at the 4-, 6-, 7-, 9-, 12-, 16-, 17- or 21-positions; and lower-alkyl groups, for example, at the 4-, 5-, 6-, 7-, 11- or 16-positions. The steroid moiety can also have one or more double bonds, especially at the 4,5- and/or 1,2- and/or 6,7-positions. The steroid moiety usually possesses angular methyl groups at $C_{10}$ and $C_{13}$, although 18- and 19-norsteroids and 18,19-bisnorsteroids, lacking one or both of the angular methyl groups at $C_{13}$ and $C_{10}$, respectively, are also representative steroids.

The 18,19-bisnorsteroid, 18,19-norsteroid and normal steroid moieties in the compounds of the invention contain, respectively, seventeen, eighteen and nineteen carbon atoms plus any carbon content which may be provided by one or more nuclearly substituted carbon containing radicals, up to and including a total of about twenty-three carbon atoms, exclusive of ester radicals.

When acyloxy radicals are present in the steroid moiety, the acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like. Esters of inorganic acids such as phosphoric acid are also contemplated.

The compounds of the invention are prepared by reacting a 2-(1-hydroxyalkylidene)-3-oxo-steroid with hydroxylamine or an acid-addition salt thereof according to the following equation:

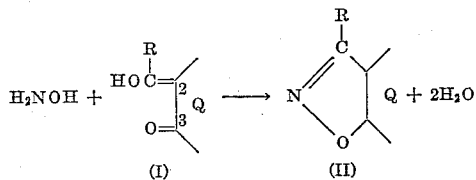

In the above general Formulas I and II, Q represents the remaining portion of the steroid moiety described above. In the above Formulas I and II, R represents a hydrogen atom or a lower-alkyl radical, the latter having preferably from one to about four carbon atoms, thus including such groups as methyl, ethyl, propyl, isopropyl, butyl, and the like.

The condensation of the hydroxylamine with a 2-hydroxyalkylidene-3-oxo-steroid is carried out by heating said steroid with at least one molar equivalent of hydroxylamine or acid-addition salt thereof in an inert solvent at a temperature between about 50° C. and 150° C. The inert solvent is preferably a lower-alkanol, e.g., methanol, or ethanol, or a lower-alkanoic acid, e.g., acetic acid or propionic acid, or a mixture of an alcohol and an acid. The reaction is catalyzed by the presence of a weak or moderate acid such as acetic acid, although if a strong acid is present it may cause dehydration of a hydroxy group in the 17-position, followed by deep-seated rearrangement of the steroid nucleus. In the event an acid-addition salt of hydroxylamine, such as the hydrochloride, is used, an approximately equivalent amount of a salt of a strong base and a weak acid, e.g., sodium acetate, is added to convert the strong acid of addition to a weak acid in order to prevent dehydration and rearrangement. 17-hydroxy groups can also be protected by esterification prior to isoxazole formation.

If the steroid moiety has a double bond already present in the 1,2-position, the essential steroid intermediate is a 2-formyl-Δ¹-steroid (III; R is H) or a 2-lower-alkanoyl-Δ¹-steroid (III; R is lower-alkyl). The reaction is represented by the following equation:

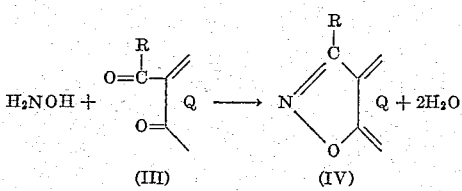

The intermediate 2-acyl-Δ¹-steroid (III) can be prepared by bromination or chlorination of a 2-acyl steroid (I) in the 2-position, followed by dehydrohalogenation with collidine or with lithium chloride in dimethylformamide solution.

Compounds having an aromatic ring A characteristic of estrogens (estratriene compounds), viz.:

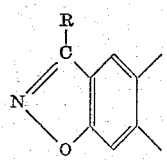

can be prepared by dehydrogenation of the corresponding Δ⁴-19-norsteroido-isoxazole by conventional procedures, as by heating with palladium-on-carbon catalyst.

A particularly preferred group of compounds, derived from readily available starting materials, comprises those having the structural formula

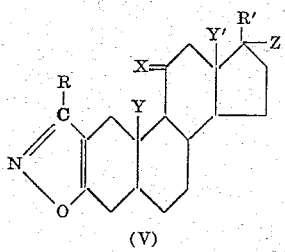

wherein R represents hydrogen or a lower-alkyl radical; R' represents hydrogen or a lower-alkyl, lower-alkenyl, lower-alkynyl, the acetyl, the hydroxyacetyl, the 1,2-dihydroxyethyl or the 1-hydroxyethyl radical; X is selected from the group consisting of H₂, (H)(OH) and O; Y and Y' represent hydrogen or the methyl radical; and Z represents hydrogen or the hydroxy radical, Z being restricted to hydroxy when R' represents hydrogen, or a lower-alkyl, lower-alkenyl or lower-alkynyl radical. Also representative of the invention are carboxylic acid esters, acid-addition salts and quaternary ammonium salts of the foregoing compounds, as well as those having one double bond in the 4,5-position (VI), or two double bonds, one in the 4,5-position and the other in the 6,7-position (VII):

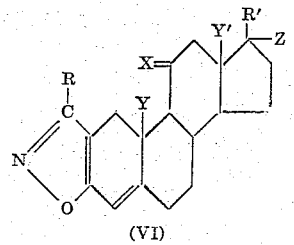

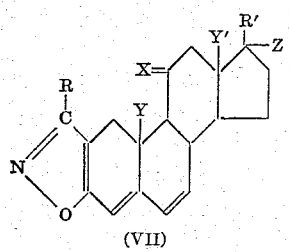

In the above general Formulas V, VI and VII, R', when it represents a lower-alkyl, lower-alkenyl, or lower-alkynyl radical, has from one to about four carbon atoms and may be straight or branched, and thus includes such groups as methyl, ethyl, propyl, isopropyl, butyl, isobutyl, tertiary-butyl, vinyl, 1-propenyl, 2-propenyl, ethynyl, propargyl, and the like.

The compounds of Formulas V, VI and VII are prepared by reacting the appropriate 2-(1-hydroxyalkylidene)-3-oxo-steroid, viz.:

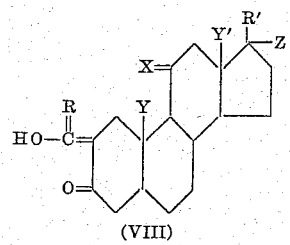

or the corresponding compounds where double bonds are present in the 4,5- or the 4,5- and 6,7-positions, with hydroxylamine or an acid-addition salt thereof; R, R', X, Z, Y and Y' have the same meanings given above. When the steroid moiety contains oxo groups in addition to the one at position 3, they can be protected as a ketal derivative to prevent side reactions with the hydroxylamine (oxime formation). For example, when compounds in which R' represents acetyl or hydroxyacetyl are desired, these radicals can be ketalized by known methods, e.g., with ethylene glycol, prior to introduction of the hydroxyalkylidene radical at the 2-position and reaction with hydroxylamine. It has been found, however, that 3,20-dioxo-steroids bearing hydroxy groups at the 17- and 21-positions can be selectively formylated in the 2-position without protecting the 20-oxo group by ketalization.

The 20-monoketals of 3,20-dioxo-steroids are prepared from the 3,20-diketals by selective hydrolysis by known methods, e.g., by allowing the diketal to stand at room temperature in acetone solution containing a trace of p-toluenesulfonic acid. The ketal groups are readily cleaved by dilute acid after the condensation with hydroxylamine. An oxo group at the 11-position is relatively unreactive and need not be protected before reaction with hydroxylamine.

In addition to the other uses set forth below, the compounds of the invention are useful as intermediates in the preparation of different species within the scope of the invention by introduction of new groups or alteration of groups already present in the steroid nucleus by known methods. For example, a steroido[2.3-d]isoxazole having a hydroxy group in the 17-position of the steroid nucleus (V, VI or VII; R' is H, Z is OH) can be oxidized to the corresponding 17-oxo compound. As another instance, a steroido[2.3-d]isoxazole having a 1-hydroxyethyl radical in the 17-position (V, VI or VII; R' is CH₂CH(OH)—, Z is H) can be oxidized to the corresponding 17-acetyl compound (V, VI or VII; R' is CH₃CO—, Z is H).

The intermediate 2-hydroxyalkylidene-3-oxo-steroids (I) are prepared by condensing a 3-oxo-steroid, a 3-oxo-Δ⁴-steroid or a 3-oxo-Δ⁴,⁶-steroid with a lower-alkyl lower-alkanoate, RCOOR''', wherein R is hydrogen or lower-alkyl and R''' is lower-alkyl, in the presence of a strong base under anhydrous conditions. The strong base is preferably an alkali metal lower-alkoxide or amide (cf. Ruzicka U.S. Patent 2,281,622), or hydride. An acyl group enters the 2-position with elimination of a molecule of an alcohol as follows:

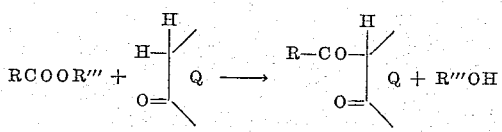

In the case wherein the radical R is lower-alkyl an alternative and preferred method comprises treating the 3-oxo-steroid with a lower-alkanoic acid anhydride in the presence of boron trifluoride. Steroids containing a 17-hydroxy group, particularly the 17-hydroxy-17-alkyl steroids, can be protected against dehydration by prior esterification.

Although, by analogy with halogenation procedures, it would be expected that ring A saturated compounds of the etiocholane series (ring juncture A/B cis) would form 4-hydroxyalkylidene derivatives rather than 2-hydroxyalkylidene derivatives, it has been found that the latter are produced preponderantly. This was proved by preparing a Δ⁴-steroido[3,2-c]pyrazole from a 2-hydroxymethylene-Δ⁴-steroid, according to the method described in the co-pending application of R. O. Clinton, Serial No. 723,148, filed March 24, 1958, hydrogenating the double bond to produce a mixture of saturated steroido[3.2-c]pyrazoles of the androstane and etiocholane series, and showing that the etiocholane isomer was identical with that produced by direct formation of the pyrazole from the hydroxy-methylene derivative of the parent etiocholane compound. If the hydroxymethylene group had entered the 4-position, the resulting prazole would have been fused to the 3,4-position of the steroid nucleus and would have been different from the etiocholanopyrazole obtained by hydrogenation of the Δ⁴-compound. Therefore, etiocholane as well as androstane compounds are useful as starting materials in the preparation of the compounds of the invention.

Isoxazoles are weakly basic substances and will form acid-addition salts upon addition of strong acids and quaternary ammonium salts upon addition of esters of strong acids.

The quaternary ammonium salts of the compounds of the invention are prepared by causing a steroido[3.2-d]-isoxazole to react with an ester of a strong inorganic or organic sulfonic acid, said ester preferably having a molecular weight less than about 200. A particularly preferred class of esters, because of their ready availability, are lower-alkyl, lower-alkenyl and lower-aralkyl esters, for example, methyl iodide, ethyl iodide, ethyl bromide, propyl bromide, butyl bromide, allyl bromide, methyl sulfate, methyl benzenesulfonate, methyl p-toluene-sulfonate, benzyl chloride, o-chlorobenzyl chloride, and the like. The reaction of the steroido[2.3-d]isoxazole and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the steroido[2.3-d]isoxazoles, and serve as intermediates for non-toxic quaternary salts by conventional ion exchange reactions. All acid-addition salts, regardless of the nature of the anions, are useful as intermediates in the purification of the free bases.

Endocrinological studies of the compounds of the invention have shown that they possess useful metabolic, hormonal and anti-hormonal properties. In particular, they exhibit one or more of the following activities: anabolic, androgenic, pituitary inhibiting, estrogenic, progestational and adrenal cortical.

The compounds of the invention further possess advantages in being anabolic (myotrophic and nitrogen retentive) at dose levels at which they do not shown an appreciable degree of sex hormonal properties. For example, 17β-hydroxy-17α-methyl - 4 - androsteno[2.3-d]isoxazole was found to have a myotrophic activity in rats about one-fourth to one-half that of testosterone propionate upon subcutaneous injection while having an androgenic activity only about one-eighth that of testosterone propionate. Anabolic agents are useful in the alleviation of conditions arising from poor nitrogen utilization in various debilitating diseases by accelerating the growth of new healthy tissue.

Generally speaking, the common anabolic agents possess a moderate to high degree of androgenic activity and their us in females leads to undesirable side-effects such as virilism and hirsutism. Therefore, the separation of these activities, as found in the compounds of the present invention, which have high anabolic but low androgenic activities, is a highly desirable feature.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The structure of the compounds of the invention was established by the mode of synthesis, their ultraviolet and infrared spectra, and by the fact that the values found upon elementary analysis corresponded with the values calculated for the assigned structures. Further evidence is provided by the fact that the steroido[2.3-d]isoxazoles of the invention are cleaved by strong base to produce 2-cyano-3-oxo-steroids (IX)

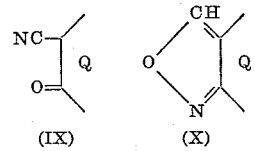

(IX)      (X)

This is analogous to the known cyclohexano[d]isoxazole which is produced as the major product of the reaction of 2-hydroxymethylenecyclohexanone and hydroxylamine, and is cleaved by base to produce 2-cyanocyclohexanone. If the hydroxylamine and 2-hydroxymethylene steroid had reacted in reverse fashion, the resulting product, a steroido[3.2-c]isoxazole (X), would be stable to base as it is known that cyclohexano[c]isoxazole is stable to base. In the 2-cyano-3-oxo-steroids (IX), the 2-cyano group assumes the α-configuration in steroids of the androstane series and in Δ⁴- and Δ⁵-steroids, whereas it assumes the β-configuration in steroids of the etiocholane series. The 2-cyano-3-oxo-steroids are also within the purview of the invention and have been found to possess hormonal properties, for example, anabolic and adrenal inhibiting activities.

The following examples will further illustrate the invention without the latter being limited thereby.

*Example 1*

(a) *2-hydroxymethylene-17α-methyl-4-androsten - 17β-ol-3-one.*—To a dry 2 liter, 3-necked flask, fitted with a stopper, gas outlet stopcock and a condenser arranged for distillation into a receiver equipped with a calcium chloride tube, was added a solution of 50.0 g. (0.165 mole) of 17α-methyl-4-androsten-17β-ol-3-one in 1200 ml. of benzene. A portion of the benzene (200 ml.) was removed by distillation to insure anhydrous conditions. The distillation apparatus was replaced with an outlet tube connected to a gas trap which consisted of a U-tube filled with an amount of mercury that would allow the escape of any positive pressure built up in the reaction flask. A slow stream of nitrogen was introduced into the reaction flask through the gas outlet stopcock. Sodium hydride (10.0 g., 0.42 mole) and 35 ml. (0.43 mole) of ethyl formate, previously dried over phosphorus pentoxide and distilled, were added. The reaction mixture was allowed to stand at room temperature under a nitrogen atmosphere for five days, after which time an orange gel had formed and no further evolution of gas could be observed. The reaction flask was fitted with a mechanical stirrer, and 25 ml. of methyl alcohol was carefully added with stirring to decompose excess sodium hydride. The reaction mixture was poured into 1500 ml. of water and shaken. The layers were separated, and the aqueous layer was extracted with ether, cooled to ice bath temperature and acidified with concentrated hydrochloric acid containing ice. The solid product was collected by filtration, washed with water and dried at 60° C. for twenty-four hours in vacuo, giving 49.1 g. of 2-hydroxymethylene-17α-methyl-4-androsten-17β-ol-3-one. A sample when recrystallized from a methanol-water mixture had the M.P. 178.5–180° C. (corr.), $[\alpha]_D^{23} = +14.0°$ (1% in chloroform); ultraviolet maxima at 252 and 307 m$\mu$ (E=12,000 and 6,030).

Analysis.—Calcd. for $C_{21}H_{30}O_3$: C, 76.32; H, 9.15. Found: C, 76.36; H, 9.19.

(b) *17β - Hydroxy - 17α - methyl-4-androsteno[2.3-d] isoxazole* [VI; R is H, R' is $CH_3$, X is $H_2$, Z is OH, Y and Y' are $CH_3$].—To a 500 ml., 3-necked flask, equipped with a sealed Hershberg-type stirrer, a reflux condenser and a stopper, was added a solution of 20.0 g. (0.0605 mole) of 2 - hydroxymethylene - 17α-methyl-4-androsten-17β-ol-3-one in 300 ml. of 95% ethanol. Stirring was commenced and a slurry of 4.80 g. (0.0585 mole) of fused sodium acetate and 4.42 g. (0.0635 mole) of hydroxylamine hydrochloride in 100 ml. of glacial acetic acid was added. The mixture was refluxed gently on a steam bath for one and one-half hours. Fifteen minutes after initiating the reaction, the reaction mixture gave a negative ferric chloride test. Most of the ethanol and acetic acid were removed by distillation in vacuo, 300 ml. of water and 300 ml. of ether were added to the concentrate, and the mixture was shaken. The layers were separated, the aqueous layer extracted with fresh ether, and the combined ether extracts were washed with water, dried over anhydrous sodium sulfate, filtered and evaporated to dryness in vacuo. The residue was crystallized by trituration with ether, and the crystals were collected by filtration, washed with hexane and dried, giving 12.0 g., M.P. 164–175° C. (uncorr.). The mother liquors were concentrated to dryness and dissolved in a minimum amount of acetone, whereupon a second crop was obtained, 2.5 g., M.P. 164–175° C. (uncorr.). The two crops were combined, dissolved in ethyl acetate, decolorized with activated charcoal, and recovered by concentration, yielding 11.8 g. of 17β - hydroxy - 17α-methyl-4-androsteno[2.3-d]isoxazole, M.P. 177.0–179.6° C. (corr.) after a second recrystallization from acetone; $[\alpha]_D^{25} = +108.8 \pm 0.3°$ (1% in chloroform); ultraviolet maximum at 285 m$\mu$ (E=11,900).

Analysis—Calcd. for $C_{21}H_{29}NO_2$: C, 77.02; H, 8.93; O, 9.77. Found: C, 76.90; H, 8.77; O, 9.80.

When measured by its effect upon the growth of the levator ani muscle in the rat, 17β-hydroxy-17α-methyl-4-androsteno[2.3-d]isoxazole was found to have a myotrophic activity about one-fourth to one-half that of testosterone propionate upon subcutaneous administration while having an androgenic activity only about one-eighth that of testosterone propionate. In nitrogen retention studies in the rat, another measure of anabolic activity, this compound was found to be about one-fourth as active as testosterone propionate.

17β - hydroxy-17α-methyl-4-androsteno[2.3-d]isoxazole can be caused to react with hydrochloric acid, hydrobromic acid, sulfuric acid or methanesulfonic acid to give the hydrochloride, hydrobromide, sulfate (or bisulfate) or methanesulfonate salt, respectively.

17β - hydroxy-17α-methyl-4-androsteno[2.3-d]isoxazole can be caused to react with methyl iodide, ethyl bromide, allyl bromide, methyl sulfate or benzyl chloride to give the methiodide, ethobromide, allobromide, methosulfate or benzochloride salt, respectively.

(c) *2α - cyano-17α-methyl-4-androsten-17β-ol-3-one.*— A solution of 5.00 g. of 17β-hydroxy-17α-methyl-androsteno[2.3-d]isoxazole in 500 ml. of absolute ether was added to a solution of sodium methoxide prepared from 0.5 g. of sodium and 5 ml. of absolute methanol. The mixture was shaken for one hour, poured into water and 100 ml. of 5% sodium hydroxide was added. The latter mixture was shaken, and the ether layer was separated, washed three times with 5% sodium hydroxide solution and once with water. The combined aqueous layers and undissolved material was cooled to 10° C. and acidified with concentrated hydrochloric acid containing ice. The acidified mixture was extracted twice with ethyl acetate, and the extracts were dried over anhydrous sodium sulfate, saturated with nitrogen and concentrated in vacuo using a stream of nitrogen. The residue was recrystallized twice from an ether-hexane mixture and dried at 95° C. in vacuo for eight hours to give 2α-cyano-17α-methyl-4-androsten-17β-ol-3-one, M.P. 167.2–171.0° C. (corr.), $[\alpha]_D^{25} = +93.0 \pm 0.1°$ (1% in chloroform); ultraviolet maxima at 243 and 310 m$\mu$ (E=14,600 and 465).

Analysis.—Calcd. for $C_{21}H_{29}NO_2$: C, 77.02; H, 8.93; O, 9.77. Found: C, 76.98; H, 8.88; O, 9.90.

*Example 2*

(a) *2 - hydroxymethylene - 17α-ethyl-4-androsten-17β-ol-3-one* was prepared from 17.19 g. of 17α-ethyl-4-androsten-17β-ol-3-one, 17 ml. of ethyl formate and 5 g. of sodium hydride in 350 ml. of benzene according to the manipulative procedure described above in Example 1, part (a). The acidic product was obtained in the form of a gum which was converted to its sodium salt and used directly in the next reaction without further purification.

(b) *17β - hydroxy - 17α - ethyl - 4-androsteno[2.3-d] isoxazole* [VI; R is H, R' is $C_2H_5$, X is $H_2$, Z is OH, Y and Y' are $CH_3$] was prepared from 7.32 g. of the sodium salt of 2-hydroxymethylene-17α-ethyl-4-androsten-17β-ol-3-one, 2.1 g. of hydroxylamine hydrochloride, 5 g. of sodium acetate trihydrate and 50 ml. of acetic acid according to the manipulative procedure described above in Example 1, part (b). The crude product was obtained in the form of a brown resin which was chromatographed on a column of silica gel in benzene solution. The column was eluted with benzene containing increasing amounts of ether, and 10% ether brought out 4.10 g. of 17β-hydroxy - 17α - ethyl - 4 - androsteno[2.3-d]isoxazole, M.P. 145.0–148.2° C. (corr.) after recrystallization successively from an ethyl acetate-ether mixture, benzene, and a benzene-ethyl acetate mixture and drying at 90–100° C. and 20 mm. for eight hours, $[\alpha]_D^{25} = +94.8 \pm 0.0°$ (1% in chloroform); ultraviolet maximum at 286 m$\mu$ (E= 10,870).

Analysis.—Calcd. for $C_{22}H_{31}NO_2$: C, 77.37; H, 9.15; O, 9,37. Found: C, 77.33; H, 9.27; O, 9.33.

17β - hydroxy - 17α-ethyl-4-androsteno[2.3-d]isoxazole was found to possess pituitary inhibitory activity.

*Example 3*

(a) *2 - hydroxymethylene - 17α-vinyl-4-androsten-17β-ol-3-one.*—A mixture of 12.04 g. of 17α-vinyl-4-androsten-17β-ol-3-one, 12 ml. of ethyl formate and 4.0 g. of sodium hydride in 300 ml. of benzene was kept at room temperature for three days under a nitrogen atmosphere. After this time about 2 g. of sodium methoxide was added and the reaction mixture allowed to stand for seven days longer. The reaction mixture was worked up according to the manipulative procedure described above in Example 1, part (a), giving 11.46 g. of 2-hydroxymethylene - 17α - vinyl-4-androsten-17β-ol-3-one in semi-crystalline form.

(b) *17β-hydroxy-17α-vinyl-4-androsteno[2.3-d]isoxazole* [VI; R is H, R' is $CH=CH_2$, X is $H_2$, Z is OH, Y and Y' are $CH_3$].—1.01 g. of sodium acetate and 0.95 g. of hydroxylamine hydrochloride in 5 ml. of water was added to a solution of 4.45 g. of 2-hydroxymethylene-17α-vinyl-4-androsten-17β-ol-3-one in about 90 ml. of ethanol, and the mixture was heated on a steam bath for two hours. The reaction mixture was poured into water, and the product was extracted with ether. The ether extracts were dried and concentrated and the residue was recrystallized first from aqueous methanol and then from an ethyl acetate-hexane mixture to give 17β-hydroxy - 17α - vinyl-4-androsteno[2,3-d]isoxazole, M.P. 139.2–145.2° C. (corr.), $[\alpha]_D^{25} = +82.1 \pm 0.1°$ (1% in chloroform); ultraviolet maximum at 285 mμ (E=10,600).

*Analysis.*—Calcd. for $C_{22}H_{29}NO_2$: C, 77.84; H, 8.61; O, 9.43. Found: C, 77.82; H, 8.90; O, 9.15.

Example 4

(a) *2-hydroxymethylene-4-androsten-17β-ol-3-one* was prepared from 25 g. of testosterone, 7.5 g. of sodium hydride and 25 ml. of ethyl formate in 500 ml. of dry benzene according to the manipulative procedure described above in Example 1, part (a). There was thus obtained 21.63 g. of 2-hydroxymethylene-4-androsten-17β-ol-3-one in crystalline form.

(b) *17β - propionoxy - 4 - androsteno[2,3-d]isoxazole* [VI; R and R' are H, X is $H_2$, Z is $OCOCH_2CH_3$, Y and Y' are $CH_3$].—A mixture of 4.0 g. of 2-hydroxymethylene-4-androsten-17β-ol-3-one, 1.3 g. of hydroxylamine hydrochloride and 180 ml. of propionic acid was stirred for about eight hours at 70–80° C. The reaction mixture was concentrated in vacuo, water was added to the residue, and the mixture was extracted with benzene. The benzene extracts were washed twice with 10% sodium bicarbonate solution, dried over anhydrous sodium sulfate and concentrated. The residue was dissolved in ether, the solution decolorized with activated charcoal, filtered, and treated with methanol to cause crystallization of the product. There was thus obtained 2.1 g. of 17β-propionoxy-4-androsteno[2,3-d]isoxazole, M.P. 129.8–133.6° C.(corr.) when recrystallized from ethyl acetate; $[\alpha]_D^{25} = +103.1 \pm 0.2°$ (1% in chloroform); ultraviolet maximum at 285 mμ (E=11,319).

*Analysis.*—Calcd. for $C_{23}H_{31}NO_3$: C, 74.76; H, 8.46; O, 13.0. Found: C, 74.80; H, 8.26; O, 13.0.

17β - propionoxy - 4-androsteno[2,3-d]isoxazole was found to possess myotrophic activity accompanied by a low degree of androgenic activity.

(c) *17β-hydroxy-4-androsteno[2,3-d]isoxazole* [VI; R and R' are H, X is $H_2$, Z is OH, Y and Y' are $CH_3$] was prepared by carrying out the procedure described above in Example 4(b) in ethanol instead of propionic acid. It was obtained in the form of light brown crystals, M.P. 183.2–184.2° C. (corr.), $[\alpha]_D^{25} = +122.8°$ (1% in 95% ethanol).

*Analysis.*—Calcd. for $C_{20}H_{27}NO_2$: C, 76.64; H, 8.68; N, 4.47. Found: C, 76.95; H, 8.63; N, 4.56.

17β - hydroxy - 4 - androsteno[2,3-d]isoxazole was found to possess anabolic activity (nitrogen retention) at 0.5 mg./kg./day in the rat.

(d) *17β - (4 - chlorophenoxyacetoxy)-4-androsteno-[2,3-d]isoxazole* [VI; R and R' are H, X is $H_2$, Z is $OCOCH_2OC_6H_4Cl$-4, Y and Y' are $CH_3$] was prepared from 17β-hydroxy-4-androsteno[2,3-d]isoxazole and p-chlorophenoxyacetyl chloride in pyridine. It was obtained in the form of straw-colored crystals, M.P. 172.8–174.8° C. (corr.), $[\alpha]_D^{25} = +92.9°$ (1% in chloroform).

*Analysis.*—Calcd. for $C_{28}H_{32}ClNO_4$: C, 69.77; H, 6.69; Cl, 7.36. Found: C, 69.72; H, 6.48; Cl, 7.48.

17β-(4-chlorophenoxyacetoxy) - 4 - androsteno[2,3-d]isoxazole was found to possess anabolic activity (nitrogen retention) at 1.0 mg./kg./day in the rat.

(e) *17β - (3 - cyclohexylpropionoxy)-4-androsteno[2,3-d]isoxazole* [VI; R and R' are H, X is $H_2$, Z is $OCOCH_2CH_2C_6H_{11}$, Y and Y' are $CH_3$] was prepared from 17β-hydroxy-4-androsteno[2,3-d]isoxazole and β-cyclohexylpropionic anhydride in pyridine. It was obtained in the form of colorless crystals, M.P. 86.2–87.4° C. (corr.), $[\alpha]_D^{25} = +93.3°$ (1% in chloroform).

*Analysis.*—Calcd. for $C_{21}H_{41}NO_3$: C, 77.12; H, 9.15; N, 3.10; O, 10.63. Found: C, 77.36; H, 8.97; N, 3.34; O, 10.90.

Example 5

(a) *2-hydroxymethylene-17α-methylandrostan-17β-ol-3-one.*—A solution of 20.7 g. of 17α-methylandrostan-17β-ol-3-one in 500 ml. of benzene was added to sodium methoxide (prepared by dissolving 15.0 g. of sodium in 250 ml. of absolute methanol, concentrating the solution and drying the residue for one hour at 150–160° C. and 15 mm.). Ethyl formate (48.8 g.) was then added with stirring in a nitrogen atmosphere. The reaction mixture was stirred for four hours longer at room temperature, allowed to stand for about fifteen hours, stirred for two hours longer and then poured into water. The reaction mixture was extracted with benzene, the aqueous layer warmed until clear, filtered and cooled below room temperature. Concentrated hydrochloric acid and ice were added to the filtrate until the mixture was acid to Congo red, and the product was extracted with chloroform. The chloroform extracts were washed with water, dried over anhydrous sodium sulfate, filtered and concentrated in vacuo to a volume of 80 ml., whereupon there separated 14.89 g. of 2-hydroxymethylene-17α-methylandrostan-17β-ol-3-one, M.P. 179–183° C. (uncorr.). A sample when recrystallized from an ether-methanol mixture and dried at 80° C. in vacuo had the M.P. 185–190.5° C. (corr.), $[\alpha]_D^{25} = +35.9°$ (1% in chloroform); ultraviolet maximum at 282 mμ (E=10,300).

*Analysis.*—Calcd. for $C_{21}H_{32}O_3$: C, 75.86; H, 9.70. Found: C, 76.10; H, 9.53.

(b) *17β - hydroxy-17α-methylandrostano[2,3-d]isoxazole* [V; R is H, R' is $CH_3$, X is $H_2$, Z is OH, Y and Y' are $CH_3$ (rings A/B trans)].—To a solution of 3.88 g. of sodium acetate trihydrate in 5 ml. of water was added 2.09 g. of hydroxylamine hydrochloride, and methanol was added until solution resulted. This solution was added to a solution of 10.0 g. of 2-hydroxymethylene-17α-methylandrostan-17β-ol-3-one in 200 ml. of absolute methanol, and the combined solution was refluxed for thirty minutes on a steam bath. The reaction mixture was concentrated, the residue extracted with ethyl acetate, and the ethyl acetate extracts were washed with ethyl acetate, and the ethyl acetate extracts were washed with 5% hydrochloric acid, dried over anhydrous sodium sulfate and concentrated to a volume of 40 ml., whereupon there separated 2.82 g. of solid material, M.P. 222–234° C. (uncorr.). The mother liquors were concentrated to dryness and the residue recrystallized from ether to give 3.32 g. of solid product, M.P. 160–168° C. (uncorr.). The latter was chromatographed on a column of silica gel in benzene solution, recrystallized from ethyl acetate and dried at 75° C. for twenty hours to give 17β-hydroxy-17α-methylandrostano[2,3-d]isoxazole, M.P. 171.4–173.2° C. (corr.), $[\alpha]_D^{25} = +42.8 \pm 0.2°$ (1% in choroform); ultraviolet maximum at 228 mμ (E=5,100).

*Analysis.*—Calcd. for $C_{21}H_{31}NO_2$: C, 76.55; H, 9.48; O, 9.71. Found: C, 76.70; H, 9.55; O, 10.00.

17β - hydroxy - 17α - methylandrostano[2,3 - d]isoxazole was found to possess myotrophic activity accompanied by a low degree of androgenic activity.

17β - hydroxy - 17α - methylandrostano[2,3 - d]isoxazole was rearranged with base to give 2α-cyano-17α-methylandrostan-17β-ol-3-one, M.P. 252.4–257.8° C. (corr.), $[\alpha]_D^{25} = +50.7°$ (0.5% in pyridine).

Example 6

(a) *2 - hydroxymethylene - 17α - methyletiocholan - 17β-ol-3-one.*—To 4.8 g. (0.2 mole) of sodium hydride suspended in 75 ml. of benzene was added 3.2 g. (0.1 mole) of methanol. After the reaction subsided, the mixture was heated to boiling, cooled, and treated with a mixture of 20.8 g. (0.068 mole) of 17α-methyletiocholan-17β-ol-3-one, 75 ml. of benzene, and 21 ml. of ethyl formate. The mixture was stirred vigorously for four hours, mixed with 200 ml. of water, and the layers were separated. The water layer was washed with ether and then acidified with hydrochloric acid. The resulting precipitate was collected by filtration and dried, giving 17.8 g. of 2-hydroxymethylene-17α-methyletiocholan-17β-ol-3-one, suitable for use in the succeeding reaction. A sample was further purified by chromatography on 100 g. of silica gel in an equal volume mixture of ether and pentane. The resulting solid was recrystallized from ether, giving colorless needles, M.P. 205.6–211.6° C. (corr.), $[\alpha]_D^{25}=+0.3\pm0.2°$ (1% in chloroform); ultraviolet maxima at 285 and 347 mμ (E=7,200 and 1,500).

*Analysis.*—Calcd. for $C_{21}H_{32}O_3$: C, 75.86; H, 9.70. Found: C, 75.69; H, 9.74.

(b) *17β - hydroxy - 17α - methyletiochlolano[2.3 - d]-isoxazole* [V; R is H, R' is $CH_3$, X is $H_2$, Z is OH, Y and Y' are $CH_3$ (Rings A/B cis)].—A stirred mixture of 3.32 g. (0.01 mole) of 2-hydroxymethylene-17α-methyletiocholan-17β-ol-3-one, 1.31 g. (0.016 mole) of fused sodium acetate, 1.01 g. (0.015 mole) of hydroxylamine hydrochloride and 100 ml. of acetic acid was heated at 60° C. for six and one-half hours. The mixture was cooled and poured into 200 ml. of water, and the precipitated solid was collected and chromatographed on 100 g. of silica gel in ether containing 20% pentane. The resulting product was recrystallized from acetone to give 1.01 g. of 17β-hydroxy-17α-methyletiocholano[2.3-d]-isoxazole in the form of colorless needles, M.P. 244.2–250.2° C. (corr.), $[\alpha]_D^{25}=-37.9\pm0.2°$ (1% in chloroform); ultraviolet maximum at 226 mμ (E=4,300).

*Analysis.*—Calcd. for $C_{21}H_{31}NO_2$: C, 76.54; H, 9.48; N, 4.25. Found: C, 76.65; H, 9.53; N, 4.23.

17β - hydroxy - 17α - methyletiocholano[2.3 - d]isoxazole was found to possess anti-estrogenic activity.

17β - hydroxy - 17α - methyletiocholano[2.3 - d]isoxazole was rearranged with base to give 2β-cyano-17α-methyletiocholan-17β-ol-3-one, M.P. 222.4–226.0° C. (corr.), $[a]_D^{25}=-30.8°$ (1% in ethanol).

Example 7

(a) *2 - hydroxymethylene - 17α - methyl - 19 - norandrostan-17 -ol-3-one* was prepared from 4.35 g. of 17α-methyl-19-norandrostan-17β-ol-3-one [Bowers et al., J. Am. Chem. Soc. 79, 4556 (1957)], 10 ml. of ethyl formate and 2.40 g. of sodium hydride according to the manipulative procedure described above in Example 1, part (a). There was thus obtained 4.35 g. of 2-hydroxymethylene-17α-methyl-19-norandrostan-17β-ol-3-one, M.P. 190–200° C. (uncorr.).

(b) *17β - hydroxy - 17α - methyl - 19 - norandrostano[2.3-d]isoxazole* [V; R is H, R' is $CH_3$, X is $H_2$, Z is OH, Y is H, Y' is $CH_3$].—A mixture of 2.39 g. of 2 - hydroxymethylene - 17α - methyl - 19 - norandrostan-17β-ol-3-one, 0.695 g. of hydroxylamine hydrochloride, 1.50 g. of sodium acetate trihydrate and 75 ml. of acetic acid was heated at 60° C. for five hours. The reaction mixture was poured into 850 ml. of water, and the precipitated solid was collected by filtration, washed with water and dried at 65° C. The latter product was recrystallized successively from aqueous methanol, ethyl acetate and acetone to give 17β-hydroxy-17α-methyl-19-norandrostano[2.3-d]isoxazole in the form of colorless needles, M.P. 197.6–199.6° C. (corr.).

*Analysis.*—Calcd. for $C_{20}H_{29}NO_2$: C, 76.39; H, 8.98; O, 10.18. Found: C, 76.02; N, 9.15; O, 10.40.

17β - hydroxy - 17α - methyl - 19 - norandrostano(2.3-d]isoxazole was found to have myotrophic activity accompanied by a low degree of androgenic activity.

Example 8

(a) *17α - ethyl - 2 - hydroxymethyleneandrostan - 17β-ol-3-one* was prepared from 7.0 g. of 17α-ethylandrostan-17β-ol-3-one, 8 ml. of ethyl formate and 3.8 g. of sodium methoxide in 150 ml. of benzene according to the manipulative procedure described above in Example 5, part (a). The product was obtained in the form of the solid sodium salt and used directly in the next reaction.

(b) *17β - hydroxy - 17α - ethylandrostano[2.3-d]isoxazole* [V; R is H, R' is $C_2H_5$, X is $H_2$, Z is OH, Y and Y' are $CH_3$].—A mixture of 3.18 g. of the sodium salt of 2-hydroxymethylene-17α-ethylandrostan-17β-ol-3-one, 1.1 g. of hydroxylamine hydrochloride, 20 ml. of ethanol and 20 ml. of acetic acid was refluxed for two hours. The product was separated and purified by chromatography on silica gel in benzene solution. The resulting product was recrystallized from benzene and dried at 70° C. and 20 mm. for eight hours to give 17β-hydroxy-17α-ethylandrostano[2.3-d]-isoxazole, M.P. 144.4–148.6° C. (corr.), $[\alpha]_D^{25}=+36.2\pm0.2°$ (1% in chloroform); ultraviolet maximum at 225 mμ (E=4,410).

*Analysis.*—Calcd. for $C_{22}H_{33}NO_2$: C, 76.92; H, 9.68; N, 4.08. Found: C, 76.77; H, 9.51; N, 4.05.

Example 9

(a) *Allopregnan - 3β - ol - 20 - one 20 - ethylene glycol ketal.*—A mixture of 27.4 g. (0.086 mole) of allopregnan-3β-ol-20-one, 33 ml. of ethylene glycol, 700 ml. of benzene and 1 g. of p-toluenesulfonic acid was refluxed for 78 hours with a water separator in the system. The reaction mixture was then cooled and shaken with 100 ml. of 2 N sodium hydroxide solution, and the resulting mixture was filtered to collect 20.5 g. of allopregnan-3β-ol-20-one 20-ethylene glycol ketal, M.P. 166–169° C. (uncorr.). When the latter was recrystallized from acetone, the compound was obtained in the form of colorless plates, M.P. 172.5–175° C. (uncorr.).

(b) *Allopregnane - 3,20 - dione 20 - ethylene glycol ketal.*—Chromic oxide (26.6 g.) was added in small portions to 425 ml. of pyridine at 25–30° C. To this mixture was added all at once a solution of 19.5 g. (0.054 mole) of allopregnan-3β-ol-20-one 20-ethylene glycol ketal in 250 ml. of pyridine. The reaction mixture was stirred at room temperature for 18 hours, diluted with 1 liter of hot benzene and filtered. The filtered solid was washed with 500 ml. of hot benzene, and the combined filtrates were washed with four 500 ml. portions of water followed by one 200 ml. portion of saturated sodium chloride solution. The organic solvent was then concentrated in vacuo, and the residue was triturated with 50 ml. of methanol. Filtration of the mixture and concentration of the filtrate to a volume of 20 ml. gave a small additional amount of solid product. The combined solid product was recrystallized from ethyl acetate using activated charcoal for decolorizing purposes to give 12.6 g. of allopregnane-3,20-dione 20-ethylene glycol ketal in the form of blades and plates, M.P. 190–191.5° C. (uncorr.).

(c) *2-hydroxymethyleneallopregnane - 3,20 - dione 20-ethylene glycol ketal* was prepared from 2.45 g. of allopregnane-3,20-dione 20-ethylene glycol ketal, 20 ml. of ethyl formate, and sodium methoxide (from 0.33 g. of sodium and 15 ml. of methanol) in 70 ml. of pyridine according to the manipulative procedure described below in Example 10, part (c). There was thus obtained 2.64 g. of 2-hydroxymethyleneallopregnane-3,20-dione 20-ethylene glycol ketal, used in the next reaction without further purification.

(d) *20-oxoallopregnano[2.3-d]isoxazole* [V; R is H, R' is $COCH_3$, X is $H_2$, Z is H, Y and Y' are $CH_3$ (rings A/B trans)].—A mixture of 1.70 g. of fused sodium acetate, 1.52 g. of hydroxylamine hydrochloride and 300 ml. of acetic acid was heated to 100° C. with stirring and then cooled to 60° C. 2-hydroxymethyleneallopregnane-3,20-dione 20-ethylene glycol ketal (7.67 g.) was then added, and the mixture was heated at 60–65° C. for seven hours. The reaction mixture was cooled and diluted with 1 liter of water, and the solid which precipitated was collected and warmed to 50° C. with 175 ml. of methanol and 2 ml. of 0.5 N hydrochloric acid for fifteen minutes. The latter mixture was cooled and filtered to give 3.3 g.

of solid product, M.P. 193–206° C. (uncorr.), which was chromatographed on 100 g. of silica gel in a solvent mixture consisting of 30% ether, 10% methylene dichloride and 60% pentane. The resulting product was recrystallized from methanol to give 20-oxoallopregnano[2.3-d]isoxazole, M.P. 204.0–209.4° C. (corr.), $[\alpha]_D^{25}$ =+134.7±0.1° (1% in chloroform); ultraviolet maximum at 225 mμ (E=4,500).

Analysis.—Calcd. for $C_{22}H_{31}NO_2$: C, 77.36; H, 9.15. Found: C, 77.15; H, 8.98.

Example 10

(a) *Pregnan-3α-ol-20-one 20-ethylene glycol ketal* was prepared from 30 g. of pregnan-3α-ol-20-one, 30 g. of ethylene glycol, 0.9 g. of 1-toluenesulfonic acid monohydrate and 700 ml. of benzene according to the manipulative procedure described above in Example 9, part (a). The resulting product was recrystallized twice from methanol with a few drops of pyridine added to give 25.6 g. of pregnan-3α-ol-20-one 20-ethylene glycol ketal in the form of colorless needles, M.P. 147.0–149.2° C. (corr.), $[\alpha]_D^{25}$=+28.5±0.2° (1% in chloroform).

Analysis.—Calcd. for $C_{23}H_{38}O_3$: C, 76.19; H, 10.57. Found: C, 76.13; H, 10.75.

(b) *Pregnane-3,20-dione 20-ethylene glycol ketal* was prepared from 25.3 g. of pregnan-3α-ol-20-one 20-ethylene glycol ketal, 33 g. of chromic oxide and 630 ml. of pyridine according to the manipulative procedure described above in Example 9, part (b). The product was recrystallized from 400 ml. of methanol to give 17.5 g. of pregnane-3,20-dione 20-ethylene glycol ketal in the form of colorless leaflets, M.P. 169.8–172.8° C. (corr.), $[\alpha]_D^{25}$=+32.0±0.1° (1% chloroform).

Analysis.—Calcd. for $C_{23}H_{36}O_3$: C, 76.62; H, 10.07. Found: C, 76.93; H, 10.08.

(c) *2 - hydroxymethylenepregnane - 3,20 - dione.*—Sodium methoxide was prepared by dissolving 0.73 g. (0.03 mole) of sodium hydride in 30 ml. of methanol and removing the excess methanol at 100° C. in vacuo. To the sodium methoxide were added 100 ml. of pyridine, 5.45 g. (0.0151 mole) of pregnane-3,20-dione 20-ethylene glycol ketal and then 30 ml. of ethyl formate. The reaction mixture was allowed to stand at room temperature for twenty-one hours and concentrated to dryness in vacuo below 45° C. The residue was dissolved in water, and carbon dioxide was passed into the solution until it reached a pH of 8. The precipitated product was collected by filtration and air dried, giving 5.9 g. of 2-hydroxymethylenepregnane-3,20-dione 20-ethylene glycol ketal, suitable for conversion to the isoxazole derivative.

A 1.5 g. portion of the 2-hydroxymethylenepregnane-3,20-dione 20-ethylene glycol ketal was dissolved in 10 ml. of methanol, 2 ml. of 2 N hydrochloric acid was added, and the mixture was heated to boiling. The solution was set aside and was allowed to cool for one hour, diluted with 6 ml. of water, and the precipitated solid was collected by filtration and chromatographed on 25 g. of silica gel in pentane containing 25% ether. There was thus obtained 0.57 g. of 2-hydroxymethylenepregnane-3,20-dione, M.P. 139.8–146.0° C. when recrystallized from methanol, $[\alpha]_D^{25}$=+114.2±0.3° (1% chloroform).

Analysis.—Calcd. for $C_{22}H_{32}O_3$: C, 76.70; H, 9.36. Found: C, 76.65; H, 9.62.

(d) *20-oxopregnano[2.3-d]isoxazole* [V; R is H, R' is COCH₃, X is H₂, Z is H, Y and Y' are CH₃ (rings A/B cis)] was prepared from 2-hydroxymethylenepregnane-3,20-dione 20-ethylene glycol ketal, hydroxylamine hydrochloride, sodium acetate and acetic acid according to the manipulative procedure described above in Example 9, part (d). The compound was obtained in the form of pale yellow crystals, M.P. 137.4–153.2° C. (corr.).

Analysis.—Calcd. for $C_{22}H_{31}NO_2$: C, 77.37; H, 9.15; N, 4.10. Found: C, 77.60; H, 9.31; N, 4.00.

Example 11

(a) *2 - hydroxymethyleneandrostan - 17β-ol-3-one* was prepared from androstan-17β-ol-3-one and ethyl formate in the presence of sodium methoxide in benzene solution according to the manipulative procedures described above in Example 5, part (a). The product was recrystallized from acetone and ether, giving 2-hydroxymethyleneandrostan-17β-ol-3-one, M.P. 126–132° C. (uncorr.); ultraviolet maximum at 282 mμ (E=8,400).

(b) *17β-acetoxyandrostano[2.3-d]isoxazole* [V; R and R' are H, X is H₂, Z is OCOCH₃, Y and Y' are CH₃].—Equimolar quantities of 2-hydroxymethyleneandrostan-17β-ol-3-one and hydroxylamine hydrochloride in glacial acetic acid were caused to react as described hereinabove for analogous procedures. The product was separated by the addition of water and filtration of the precipitated product. The product was recrystallized first from methanol and then from acetone and dried at 85–105° C. for sixteen hours to give 17β-acetoxyandrostano-[2.3]isoxazole, M.P. 164.0–166.0° C. (corr.), $[\alpha]_D^{25}$=+39.6±0.2° (1% in chloroform); ultraviolet maximum at 226 mμ (E=4,300).

Analysis.—Calcd. for $C_{22}H_{31}NO_3$: C, 73.91; H. 8.74; O, 13.43. Found: C, 73.66; H, 8.64; O, 13.15.

17β-acetoxyandrostano[2.3]isoxazole was found to have myotrophic activity accompanied by a low degree of androgenic activity.

(c) *17β-hydroxyandrostano[2.3-d]isoxazole* [V; R and R' are H, X is H₂, Z is OH, Y and Y' are CH₃], obtained by hydrolysis of 17β-acetoxyandrostano[2.3-d]isoxazole, had the M.P. 179.8–182.0° C. (corr.), $[\alpha]_D^{25}$=+61.6° (1% in chloroform); ultraviolet maximum at 228 mμ (E=4,900).

Analysis.—Calcd. for $C_{20}H_{29}NO_2$: C, 76.16; H, 9.27; O, 10.15. Found: C, 75.93; H, 9.38; O, 9.90.

17β-hydroxyandrostano[2.3-d]isoxazole was found to possess anabolic activity and myotrophic activity with moderate to high degree of separation of myotrophic and androgenic actvity.

17β-hydroxyandrostano[2.3-d]isoxazole was rearranged with base to give 2α-cyandrostan-17β-ol-3-one, M.P. 250.0–252.0° C. (corr.).

(d) *The 17β-(3-cyclohexylpropionate) of 17β-hydroxystano[2.3-d]isoxazole* [V; R and R' are H, X is H₂, Z is OCOCH₂CH₂C₆H₁₁, Y and Y' are CH₃] had the M.P. 140.4–141.8° C. (corr.), $[\alpha]_D^{25}$=+40.6° (1% in chloroform.

Analysis.—Calcd. for $C_{29}H_{43}NO_3$: C, 76.78; H, 9.56; N, 3.09. Found: C, 76.54; H, 9.63; N, 3.12.

The 17β-(3-cyclohexylpropionate) of 17β-hydroxyandrostano[2.3-d]isoxazole was found to possess anabolic activity and myotrophic activity of long duration with a high degree of separation of myotrophic and androgenic activities.

(e) *17β - (4-chlorophenoxyacetoxy)androstano[2.3-d] isoxazole* [V; R and R' are H, X is H₂, Z is $$OCOCH_2OC_6H_4Cl-4$$

Y and Y' are CH₃] was prepared from 17β-hydroxyandrostano[2.3-d]isoxazole and p-chlorophenoxyacetyl chloride in pyridine. It was obtained in the form of colorless needles, M.P. 152.2–153.2° C. (corr.), $[\alpha]_D^{25}$=+38.2° (1% in chloroform).

Analysis.—Calcd. for $C_{28}H_{34}ClNO_4$: C, 69.48; H. 7.08; Cl, 7.33. Found: C, 69.16; H, 7.11; Cl, 7.70.

17β - (4 - chlorophenoxyacetoxy)androstano[2.3 - d] isoxazole was found to possess anabolic activity (nitrogen retention) at 0.8 mg./kg./day subcutaneously in the rat.

(f) *17β-(trimethylacetoxy)androstano[2.3-d]isoxazole* [V; R and R' are H, X is H₂, Z is OCOC(CH₃)₃, Y and Y' are CH₃] was prepared from 17β-hydroxyandrostano[2.3-d]isoxazole and trimethylacetyl chloride in pyridine. It was obtained in the form of colorless needles, M.P. 188.2–189.2° C. (corr.), $[\alpha]_D^{25}$=+40.2° (1% in chloroform).

Analysis.—Calcd. for $C_{25}H_{37}NO_3$: C, 75.17; H, 9.33; O, 12.01. Found: C, 75.46; H, 9.20; O, 12.25.

(g) *17β - (3-cyclopentylpropionoxy)androstano[2.3-d]isoxazole* [V; R and R' are H, X is $H_2$, Z is

Y and Y' are $CH_3$] was prepared from 17β-hydroxyandrostano[2.3-d]isoxazole and β-cyclopentylpropionyl chloride in pyridine. It was obtained in the form of colorless needles, M.P. 142.6–143.4° C. (corr.), $[\alpha]_D^{25} = +41.2°$ (1% in chloroform).

Analysis.—Calcd. for $C_{28}H_{41}NO_3$: C, 76.49; H, 9.40; O, 10.92. Found: C, 76.53; H, 9.37; O, 10.60.

17β - (3 - cyclopentylpropionoxy)androstano[2.3 - d]isoxazole was found to possess anabolic activity and myotrophic activity of long duration with a high degree of separation of myotrophic and androgenic activities.

17β - (3 - phenylpropionoxy)androstano[2.3 - d]isoxazole can be prepared by an analogous procedure.

*Example 12*

(a) *2-acetyl-17β-acetoxyandrostan-3-one.*—A mixture of 9.6 g. (0.16 mole) of glacial acetic acid and 50 ml. of ethylene dichloride was cooled in an ice-bath, and dry boron trifluoride gas was passed into the solution until it was saturated. With continued addition of boron trifluoride, a solution of 11.60 g. (0.04 mole) of androstan-17β-ol-3-one and 12.2 g. (11.14 ml., 0.12 mole) of acetic anhydride in 75 ml. of ethylene dichloride was added. The reaction mixture was stirred in the ice-bath for thirty minutes and at room temperature for three hours, and then poured into a solution of 30 g. of sodium acetate trihydrate in 200 ml. of water. The organic solvent was distilled off, and the residue refluxed for forty-five minutes and diluted with water. The solid product was collected by filtration, suspended in 200 ml. of methanol containing 23 ml. of 35% sodium hydroxide solution with stirring, 25 ml. of water was added, and the solution allowed to stand for one hour. The solution was acidified with glacial acetic acid, the methanol removed in vacuo, and water was added to precipitate a gummy product. The latter was separated and dissolved in 25 ml. of acetic anhydride and 20 ml. of pyridine, and the solution was kept at room temperature and heated for one hour on a steam bath. The reaction mixture was added to cold, dilute sulfuric acid and the product collected, washed, dissolved in hot methanol, and the solution filtered. Water was added to the filtrate to the point of turbidity, and the product which separated upon cooling was collected and dried at 70° C.; yield 11.59 g., M.P. 132–158° C. (uncorr.). The latter was dissolved in n-hexane and chromatographed on alumina. The fraction eluted with 20% ether in n-pentane was recrystallized from acetone and dried in vacuo at 110° C. for eight hours, giving 6.98 g. of 2-acetyl-17β-acetoxyandrostan-3-one, M.P. 183.0–184.6° C. (corr.), $[\alpha]_D^{25} = +39.4 \pm 0.2°$ (1% in chloroform); ultraviolet maximum at 290 mμ (E=9,100).

Analysis.—Calcd. for $C_{23}H_{34}O_4$: C, 73.76; H, 9.15. Found: C, 73.80; H, 9.55.

(b) *2-acetylandrostan-17β-ol-3-one.*—A solution of 2-acetyl-17β-acetoxyandrostan-3-one in methanol was treated with an excess of 35% sodium hydroxide solution, and the mixture was allowed to stand at room temperature for one hour. The reaction mixture was neutralized with acetic acid and diluted with water, and the product was isolated and purified by chromatography on silica gel, giving 2-acetylandrostan-17β-ol-3-one, M.P. 149.6–154.0° C. (corr.), $[\alpha]_D^{25} = +62.3 \pm 0.1°$ (1% in chloroform), when recrystallized from an ethyl acetate-petroleum ether mixture.

(c) *17β - hydroxyandrostano[2.3-d]3'-methylisoxazole* [V; R is $CH_3$, R' is H, X is $H_2$, Z is OH, Y and Y' are $CH_3$].—A mixture of 3.32 g. of 2-acetylandrostan-17β-ol-3-one, 0.73 g. of hydroxylamine hydrochloride and 25 ml. of acetic acid was boiled for ten minutes. The reaction mixture was diluted with water, and the product which precipitated was collected by filtration and recrystallized from aqueous methanol, giving 2.83 g. of solid, M.P. 158–194° C. (uncorr.). The total product, including the latter solid, was dissolved in 80 ml. of ether, the solution diluted to 800 ml. with pentane and chromatographed on a column of 200 g. of silica gel. The column was eluted with pentane containing gradually increasing amounts of ether. Elution with 20% ether brought out 1.21 g. of crystalline product, M.P. 180–190° C. (uncorr.). Subsequent elution with 40% ether brought out 2.07 g. of solid product, M.P. 176–204° C. (uncorr.). The latter was recrystallized successively from aqueous methanol, ethyl acetate and acetone and dried at 110° C. in vacuo for seven hours to give 17β-hydroxyandrostano[2.3-d]-3'-methylisoxazole in the form of blunt needles, M.P. 208.8–219.6° C. (corr.), $[\alpha]_D^{25} = +56.4 \pm 0.1°$ (1% in chloroform); ultraviolet maximum at 227 mμ (E=5,500).

Analysis.—Calcd. for $C_{21}H_{31}NO_2$: C, 76.55; H, 9.48; N, 4.25. Found: C, 76.33; H, 9.41; N, 4.14.

The material, M.P. 180–190° C. (uncorr.), eluted with 20% ether, was recrystallized from methanol and from hexane to give 17β-acetoxyandrostano[2.3-d]-3'-methylisoxazole, M.P. 189.2–195.20° C. (corr.)

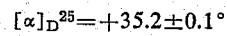

(1% in chloroform).

*Example 13*

(a) *2-(n-butyryl)androstan-17β-ol-3-one* was prepared from 27.68 g. of 17β-(n-butyryloxy-androstan-3-one (M.P. 97–99° C.), 24.3 g. of n-butyric anhydride and 27.1 g. of n-butyric acid in the presence of boron trifluoride according to the manipulative procedure described above in Example 12, part (a). The initial product obtained, 2-(n-butyryl)-17β-(n-butyryloxy)androstan-3-one was saponified by treating a methanol solution of the compound with 35% sodium hydroxide at room temperature, and the resulting 17β-hydroxy compound was chromatographed on silica gel to give 25.14 g. of 2-(n-butyryl)androstan-17β-ol-3-one, M.P. 130.8–132.8° C. (corr.), colorless prisms from methanol, $[\alpha]_D^{25} = +55.8 \pm 0.1°$ (1% in chloroform); ultraviolet maximum at 290 mμ (E=9,470).

Analysis.—Calcd. for $C_{23}H_{36}O_3$: C, 76.62; H, 10.07. Found: C, 76.70; H, 10.10.

(b) *17β - hydroxyandrostano[2.3 - d]-3' - (n - propyl)isoxazole* [V; R is $(CH_2)_2CH_3$, R' is H, X is $H_2$, Z is OH, Y and Y' are $CH_3$] was prepared from 3.60 g. of 2-(n-butyryl)androstan-17β-ol-3-one, 0.73 g. of hydroxylamine hydrochloride, 1.29 g. of sodium acetate trihydrate and 50 ml. of absolute ethanol according to the manipulative procedure described above in Example 1, part (b). The product was a colorless resin and gave a negative ferric chloride test.

The *benzoate ester of 17β-hydroxyandrostano[2.3-d]-3'-(n-propyl)isoxazole* [V; R is $(CH_2)_2CH_3$, R' is H, X is $H_2$, Z is $OCOC_6H_5$, Y and Y' are $CH_3$] was obtained in the form of colorless prisms, M.P. 199.4–202.6° C. (corr.), $[\alpha]_D^{25} = +82.4°$ (1% in chloroform); ultraviolet maxima at 229, 273 and 281 mμ (E=20,463, 925 and 731).

Analysis.—Calcd. for $C_{30}H_{39}NO_3$: C, 78.05; H, 8.52; N, 3.03. Found: C, 78.31; H, 8.77; N, 3.03.

*Example 14*

(a) *2-hydroxymethylene-4,6-androstadien-17β-ol-3-one* was prepared from 12.41 g. of 4,6-androstadien-17β-ol-3-one, 14 ml. of ethyl formate and 3.9 g. of sodium hydride according to the manipulative procedure described above in Example 1, part (a). There was thus obtained 13.15 g. of 2-hydroxymethylene-4,6-androstadien-17β-ol-3-one, M.P. 80–100° C. (uncorr.).

(b) *17β - acetoxy - 4,6 - androstadieno[2.3-d]isoxazole* [VII; R and R' are H, X is $H_2$, Z is $OCOCH_3$, Y and Y' are $CH_3$].—A mixture of 5.73 g. of 2-hydroxymethylene-4,6-androstadien-17β-ol-3-one, 1.39 g. of hydroxylamine hydrochloride and 100 ml. of acetic acid was boiled for ten minutes. The product was isolated by dilution with water and collection of the precipitated product, and the latter was chromatographed on silica gel in benzene solution. The column was eluted with benzene containing gradually increasing amounts of ether. The material eluted with 5% ether in benzene was recrystallized from benzene and from ethyl acetate, and dried at 70° C. in vacuo for fifteen hours to give 17β-acetoxy-4,6-androstadieno[2.3-d]isoxazole, M.P. 157.4–161.4° C. (corr.), $[\alpha]_D^{25} = -182.6 \pm 0.3°$ (1% in chloroform) ultraviolet maxima at 244, 252 and 319 mμ (E=3,150, 2,740 and 18,240).

*Analysis.*—Calcd. for $C_{22}H_{27}NO_3$: C, 74.75; H, 7.70; N, 3.96; O, 13.58. Found: C, 73.97; H, 8.09; N, 3.92; O, 13.25.

The crystalline fraction eluted with 25% ether in benzene from the chromatogram was recrystallized successively from benzene, ethanol, ethyl acetate and ethanol and dried at 75° C. in vacuo for fifteen hours. There was thus obtained 17β-hydroxy-4,6-androstadieno[2.3-d]isoxazole, M.P. 216.2–219.6° C. (corr.), $[\alpha]_D^{25} = -134.7 \pm 0.1°$ (1% in chloroform); ultraviolet maxima at 235, 254 and 319 mμ (E=2,900, 2,500 and 17,800).

*Analysis.*—Calcd. for $C_{20}H_{25}NO_2$: C, 77.13; H, 8.09; N, 4.50. Found: C, 76.89; H, 7.85; N, 4.49.

17β-hydroxy-4,6-androstadieno[2.3-d]isoxazole and its acetate were found to have myotrophic activity with a low degree of androgenic activity.

17β-hydroxy-4,6-androstadieno[2.3-d]isoxazole can be reacted with acetic anhydride, propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride, or cinnamoyl chloride, by heating in the presence of pyridine, to give, respectively, 17β-acetoxy-4,6-androstadieno[2.3-d]isoxazole,
17β-propionoxy-4,6-androstadieno[2.3-d]isoxazole,
17β-caproyloxy-4,6-androstadieno[2.3-d]isoxazole,
17β-(β-carboxypropionoxy)-4,6-androstadieno[2.3-d]isoxazole,
17β-(β-cyclopentylpropionoxy)-4,6-androstadieno-[2.3-d]isoxazole,
17β-benzoyloxy-4,6-androstadieno[2.3-d]isoxazole,
17β-(p-nitrobenzoyloxy)-4,6-androstadieno[2.3-d]isoxazole,
17β-(3,4,5-trimethoxybenzoyloxy)-4,6-androstadieno-[2.3-d]isoxazole,
17β-phenylacetoxy-4,6-androstadieno[2.3-d]isoxazole, or
17β-cinnamoyloxy-4,6-androstadieno[2.3-d]isoxazole.

Example 15

(a) *2-hydroxymethylene-17α-methyl-4,6-androstadien-17β-ol-3-one* was prepared from 11.4 g. of 17α-methyl-4,6-androstadien-17β-ol-3-one, 12.0 ml. of ethyl formate and 3.7 g. of sodium hydride in 250 ml. of benzene according to the manipulative procedure described above in Example 1, part (a). There was thus obtained 5.3 g. of 2-hydroxymethylene-17α-methyl-4,6-androstadien-17β-ol-3-one, M.P. 117–123° C. (uncorr.).

(b) *17β-hydroxy-17α-methyl-4,6-androstadieno[2.3-d]isoxazole* [VII; R is H, R' is CH₃, X is H₂, Z is OH, Y and Y' are CH₃].—A mixture of 3.3 g. of 2-hydroxymethylene-17α-methyl-4,6-androstadien-17β-ol-3-one, 1.0 g. of hydroxylamine hydrochloride, 1.3 g. of fused sodium acetate and 150 ml. of glacial acetic acid was heated at 75–80° C. for seven hours. The reaction mixture was concentrated in vacuo, water was added to the residue and the product was extracted with benzene. The benzene extracts were washed with sodium bicarbonate solution and water, dried over anhydrous sodium sulfate and concentrated. The residue was triturated with ether to give 2.55 g. of 17β-hydroxy-17α-methyl-4,6-androstadieno[2.3-d]isoxazole, M.P. 193.4–199.0° C. (corr.) when recrystallized from acetone, $[\alpha]_D^{25} = -187.8 \pm 0.2°$ (1% in chloroform); ultraviolet maxima at 319, 253, 245 and 236 mμ (E=19,800, 2,500, 2,990 and 3,400).

*Analysis.*—Calcd. for $C_{21}H_{27}NO_2$: C, 77.50; H, 8.36; O, 983. Found: C, 77.19; H, 8.29; O, 10.05.

17β-hydroxy-17α-methyl-4,6-androstadieno[2.3-d]isoxazole was found to have myotrophic and pituitary inhibiting activities accompanied by a low degree of androgenic activity.

Example 16

(a) *2-hydroxymethylene-17α-ethyl-4,6-androstadien-17β-ol-3-one* was prepared from 8.83 g. of 17α-ethyl-4,6-androstadien-17β-ol-3-one, 10 ml. of ethyl formate and 2.8 g. of sodium hydride in 200 ml. of benzene according to the manipulative procedure described above in Example 1, part (a). There was thus obtained 9.68 g. of 2-hydroxymethylene-17α-ethyl-4,6-androstadien-17β-ol-3-one in the form of its sodium salt.

(b) *17β-hydroxy-17α-ethyl-4,6-androstadieno[2.3-d]isoxazole* [VII; R is H, R' is C₂H₅, X is H₂, Z is OH, Y and Y' are CH₃].—A mixture of 3.64 g. of the sodium salt of 2-hydroxymethylene-17α-ethyl-4,6-androstadien-17β-ol-3-one, 0.76 g. of hydroxylamine hydrochloride, 0.10 g. of sodium acetate and 50 ml. of acetic acid was refluxed for five minutes. The product was isolated by dilution with water and collection of the resulting precipitate, and was recrystallized successively from benzene, ethanol and ethyl acetate, and dried at 70° C. for three days and then at 100° C. for eight hours to give 17β-hydroxy-17α-ethyl-4,6-androstadieno[2.3-d]isoxazole in the form of yellow granules, M.P. 176.6–185.0° C. (corr.), $[\alpha]_D^{25} = -209.4 \pm 0.1°$ (1% in chloroform); ultraviolet maxima at 243, 252 and 319 mμ (E=2,900, 2,500 and 17,800).

*Analysis.*—Calcd. for $C_{22}H_{29}NO_2$: C, 77.84; H, 8.61; O, 9.43. Found: C, 77.74; H, 8.34; O, 9.60.

Example 17

*17α,17β-dimethyl-18-nor-12-androsteno[2.3-d]isoxazole.*—A mixture of 3.33 g. of 2-hydroxymethylene-17α-methylandrostan-17β-ol-3-one, 0.70 g. of hydroxylamine hydrochloride and 30 ml. of glacial acetic acid was refluxed for five minutes. The product was isolated by dilution with water and collection of the resulting precipitate, and the resulting 2.56 g. of material was recrystallized several times from ethanol and dried at 40° C. for seventy-two hours in vacuo to give 17α,17β-dimethyl-18-nor-12-androsteno[2.3-d]isoxazole, M.P. 134.0–138.6° C. (corr.), $[\alpha]_D^{25} = -7.8 \pm 0.1°$ (1% in chloroform); ultraviolet maximum at 222 mμ (E=5,800).

*Analysis.*—Calcd. for $C_{21}H_{29}NO$: C, 80.98; H, 9.39; O, 5.14. Found: C, 80.94; H, 9.39; O, 5.20.

The foregoing product proved to be homogeneous upon chromatography, and the structure assigned is supported by infrared data. There is no indication of hydroxyl or carbonyl absorption, and an absorption maximum at 7.34 mμ was assigned to a gem-dimethyl group after comparison with model compounds.

Example 18

17-oxo-4,6-androstadieno[2.3-d]isoxazole can be prepared by treating a solution of 17β-hydroxy-4,6-androstadieno[2.3-d]isoxazole [Example 14, part (b)] in glacial acetic acid with a solution of chromic oxide in aqueous acetic acid. The product is isolated by addition of water and collection of the resulting precipitate.

Example 19

(a) *17α-ethynyl-2-hydroxymethylene-4-androsten-17β-ol-3-one.*—To a solution of 14.2 g. of 17α-ethynyl-4-androsten-17β-ol-3-one in 300 ml. of dry pyridine was added 23 ml. of dry ethyl formate and then a solution of sodium ethoxide in ethanol (from 2.1 g. of sodium and 35 ml. of absolute ethanol). The reaction mixture was allowed to stand at room temperature for forty-two hours and then poured onto ice-water. Glacial acetic acid (218 ml.) was added and the gummy product was separated and dissolved in ether. The ether solution was washed with a solution of 30 g. of potassium hydroxide in 1.5 liters of water, and the aqueous layer was cooled to 5° C. and acidified with 6 N hydrochloric acid. The precipitated product was collected by filtration and dried in vacuo over phosphorus pentoxide at 60° C., giving 13.5 g. of 17α-ethynyl-2-hydroxymethylene-4-androsten-17β-ol-3-one.

(b) 17α-ethynyl - 17β-hydroxy - 4 - androsteno[2.3-d]-isoxazole [VI; R is H, R' is C≡CH, X is $H_2$, Z is OH, Y and Y' are $CH_3$] was prepared from 4.32 g. of 17α-ethynyl-2-hydroxymethylene - 4 - androsten-17β-ol-3-one, 1.00 g. of hydroxylamine hydrochloride, 1.12 g. of fused sodium acetate and 135 ml. of acetic acid according to the manipulative procedure described above in Example 1, part (b). There was thus obtained 2.35 g. of 17α-ethynyl-17β-hydroxy-4-androsteno[2.3-d]isoxazole, M.P. 224.2–226.8° C. (corr.) when recrystallized from acetone; $[\alpha]_D^{25}=+7.5\pm0.2°$ (in 95% ethanol); ultraviolet maximum at 286 mμ (E=11,300).

Analysis.—Calcd. for $C_{22}H_{27}NO_2$: C, 78.30; H, 8.07; O, 9.48. Found: C, 78.00; H, 8.06; O, 9.10.

17α - ethynyl - 17β - hydroxy - 4 - androsteno[2.3-d]-isoxazole has been found to possess anabolic and myotrophic activity with a low degree of androgenic activity. It also was found to possess estrogenic and pituitary inhibitory activity.

*Example 20*

(a) 2-hydroxymethylene-4-pregnen-20β-ol-3-one was prepared from 4.97 g. of 4-pregnen-20β-ol-3-one, 5 ml. of ethyl formate and 1.0 g. of sodium hydride in 100 ml. of benzene according to the manipulative procedure described above in Example 1, part (a).

(b) 20β-hydroxy-4-pregneno[2.3-d]isoxazole [VI; R is H, R' is CH(OH)$CH_3$, X is $H_2$, Z is H, Y and Y' are $CH_3$] was prepared from the 2-hydroxymethylene-4-pregnen-20β-ol-3-one obtained above in part (a) and 1.20 g. of hydroxylamine hydrochloride in 200 ml. of ethanol according to the manipulative procedure described above in Example 1, part (b). There was thus obtained 20β-hydroxy-4-pregneno[2.3-d]isoxazole, M.P. 129.2–147.8° C. (corr.), $[\alpha]_D^{25}=+105.0\pm0.2°$ (1% in chloroform); ultraviolet maximum at 286 mμ (E=10,050).

Analysis.—Calcd. for $C_{22}H_{31}NO_2$: C, 77.37; H, 9.15; O, 9.37. Found: C, 77.16; H, 9.21; O, 9.70.

*Example 21*

20-oxo-4-pregneno[2.3-d]isoxazole [VI; R is H, R' is $COCH_3$, X is $H_2$, Z is H, Y and Y' are $CH_3$].—To a solution of 1.10 g. of 20β-hydroxy-4-pregneno[2.3-d]isoxazole in 80 ml. of acetone was added 8.46 ml. of oxidizing solution (prepared from 26.7 g. of chromic oxide, 23 ml. of concentrated sulfuric acid and 40 ml. of water, diluted to 1000 ml. with water) dropwise during ten minutes. The reaction mixture was kept at room temperature for ten minutes, poured into 200 ml. of water and extracted with ethyl acetate. The ethyl acetate extracts were washed with water, dried over anhydrous sodium sulfate and concentrated. The residue was dissolved in acetone, retreated with 14.25 ml. of the oxidizing solution, and the product worked up as before. The crude product was dissolved in benzene and chromatographed on a column of silica gel. The column was eluted successively with pentane-benzene (1:1), benzene, and benzene-ether (19:1). The last named solvent mixture brought out the desired product which was recrystallized from an acetone-ether mixture, giving 20-oxo-4-pregneno[2.3-d]isoxazole, M.P. 182.5–187° C. (uncorr.). A purified sample of the compound had the M.P. 181.4–183.0° C. (corr.), $[\alpha]_D^{25}=+220.9\pm0.2°$ (1% in chloroform); ultraviolet maximum at 285 mμ (E=11,000).

Analysis.—Calcd. for $C_{22}H_{29}NO_2$: C, 77.83; H, 8.61; O, 9.43. Found: C, 78.09; H, 8.91; O, 9.47.

20-oxo-4-pregneno[2.3-d]isoxazole was found to possess progestational activity when injected intramuscularly in rabbits at a dose level of 1.0 mg./kg.

*Example 22*

(a) 2-hydroxymethylene-4,4,17α-trimethyl-5-androsten-17β-ol-3-one was prepared from 6.2 g. of 4,4,17α-trimethyl-5-androsten-17β-ol-3-one, 16 ml. of ethyl formate and sodium methoxide (from 2.2 g. of sodium and 40 ml. of methanol) in 400 ml. of benzene according to the manipulative procedure described above in Example 5, part (a). There was thus obtained 5.54 g. of 2-hydroxymethylene-4,4-17α-trimethyl-5-androsten-17β-ol-3-one.

(b) 17β-hydroxy-4,4,17α-trimethyl-5-androsteno[2,3-d]isoxazole can be prepared from 4.5 g. of 2-hydroxymethylene-4,4-17α-trimethyl-5-androsten-17β-ol-3-one, 0.91 g. of hydroxylamine hydrochloride, 1.03 g. of sodium acetate and 150 ml. of acetic acid according to the manipulative procedure described above in Example 1, part (b). The crude product was chromatographed on silica gel in benzene solution, eluted with benzene containing 5% of ether and recrystallized from ethanol to give 17β-hydroxy-4,4,17α-trimethyl-5-androsteno[2,3-d]isoxazole, M.P. 177.6–180.8° C. (corr.), $[\alpha]_D^{25}=-66.9\pm0.1°$ (1% in 95% ethanol); ultraviolet maximum at 229 mμ (E=6,200).

Analysis.—Calcd. for $C_{23}H_{33}NO_2$: C, 77.70; H, 9.36; O, 9.00. Found: C, 77.71; H, 9.17; O, 9.30.

17β-hydroxy-4,4,17α-trimethyl - 5 - androsteno[2.3-d]-isoxazole was found to possess a blocking action on the adrenal response to ACTH in castrated male rats.

17β-hydroxy-4,4,17α-trimethyl - 5 - androsteno[2.3-d]-isoxazole was rearranged with base to give 2α-cyano-4,4,17α-trimethyl-5-androsten-17β-ol - 3 - one, M.P. 226.8–229.6° C. (corr.), $[\alpha]_D^{25}=-24.8°$ (0.5% in ethanol).

*Example 23*

(a) 2-hydroxymethylene-4,4-dimethyl - 5 - androsten-17β-ol-3-one was prepared from 6.69 g. of 4,4-dimethyl-5-androsten-17β-ol-3-one, 9.5 ml. of ethyl formate, 0.95 g. of sodium and 18–20 ml. of ethanol in 65 ml. of pyridine according to the manipulative procedure described above in Example 19, part (a). There was thus obtained 5.21 g. of 2-hydroxymethylene-4,4-dimethyl-5-androsten-17β-ol-3-one.

(b) 4,4-dimethyl-17β-hydroxy - 5 - androsteno[2.3-d]-isoxazole can be prepared from 2-hydroxymethylene-4,4-dimethyl-5-androsten-17β-ol-3-one and hydroxylamine hydrochloride according to the manipulative procedure described above in Example 1, part (b).

*Example 24*

(a) 2-hydroxymethylene - 4,4,17α - trimethylandrostan-17β-ol-3-one was prepared from 6 g. of 4,4-17α-trimethyl-androstan-17β-ol-3-one, 10 ml. of ethyl formate, 0.85 g. of sodium and 15 ml. of ethanol in 125 ml. of pyridine according to the manipulative procedure described above in Example 19, part (a). There was thus obtained 5.0 g. of 2-hydroxymethylene-4,4,17α-trimethylandrostan - 17β-ol-3-one, M.P. 150–154° C. (uncorr.).

(b) 4,4,17α-trimethyl-17β - hydroxyandrostano[2.3-d]-isoxazole was prepared from 2.8 g. of 2-hydroxymethylene-4,4,17α-trimethylandrostan-17β-ol-3-one, 0.57 g. of hydroxylamine hydrochloride, 0.64 g. of sodium acetate and 90 ml. of acetic acid according to the manipulative procedure described above in Example 1, part (b). The product was recrystallized from ethanol to give 4,4,17α-trimethyl-17β - hydroxyandrostano[2.3-d]isoxazole, M.P. 210–214° C. (uncorr.); ultraviolet maximum at 228mμ (E=5,456). A purified sample had the M.P. 207.2–209.8° C. (corr.), $[\alpha]_D^{25}=+7.07\pm0.25°$ (1% in ethanol).

Analysis.—Calcd. for $C_{23}H_{35}NO_2$: C, 77.27; H, 9.87; O, 8.95. Found: C, 77.58; H, 9.98; O, 9.03.

Example 25

(a) 2-hydroxymethylene-6α,17α-dimethyl-4-androsten-17β-ol-3-one was prepared from 5.0 g. of 6α,17α-dimethyl-4-androsten-17β-ol-3-one, 5.0 ml. of ethyl formate and 1.5 g. of sodium hydride in 100 ml. of benzene according to the manipulative procedure described above in Example 1, part (a).

(b) 6α,17α-dimethyl-17β-hydroxy-4-androsteno[2.3-d]isoxazole was prepared from 2-hydroxymethylene-6α,17α-dimethyl-4-androsten 17β-ol-3-one and hydroxylamine hydrochloride according to the manipulative procedure described above in Example 1, part (b). It had the M.P. 177.0–182.2° C. (corr.), $[\alpha]_D^{25} = +90.2 \pm 0.5°$ (1% in chloroform); ultraviolet maximum at 285 mμ (E=10,700).

*Analysis.*—Calcd. for $C_{22}H_{31}NO_2$: C, 77.37; H, 9.15; N, 4.10. Found: C, 77.58; H, 8.97; N, 3.93

Example 26

(a) 2 - hydroxymethylene-4-pregnene-17α,21-diol-3,11,20-trione was prepared from 2.0 g. (0.005 mole) of 21-acetoxy-4-pregnen-17α-ol-3,11,20-trione (cortisone acetate) and 1.0 g. of sodium hydride in 100 ml. of pyridine according to the manipulative procedure described above in Example 19, part (a), all operations being carried out in a nitrogen atmosphere. In the process the 21-acetoxy group was saponified to give 1.3 g. of 2-hydroxymethylene - 4 - pregnene-17α,21-diol-3,11,20-trione; ultraviolet maxima at 246 and 293 mμ (E=8,000 and 4,300), characteristic of the 2-hydroxymethylene-Δ⁴-3-oxo grouping.

(b) 17α,21 - dihydroxy-11,20-dioxo-4-pregneno[2.3-d]isoxazole [VI; R is H, R' is COCH₂OH, X is O, Z is OH, Y and Y' are CH₃] was prepared from 2-hydroxymethylene-4-pregnene-17α,21-diol-3,11,20-trione and hydroxylamine hydrochloride according to the manipulative procedure described above in Example 1, part (b). The product was purified in the form of its 21-acetate which was obtained in the form of colorless prisms, M.P. 246.2–254.2° C. (corr.), $[\alpha]_D^{25} = +215.7°$ (1% in chloroform); ultraviolet maximum at 287 mμ (E=10,600).

*Analysis.*—Calcd. for $C_{24}H_{29}NO_6$: C, 67.42; H, 6.84; N, 3.28. Found: C, 67.65; H, 6.58; N, 3.23.

Example 27

(a) 2 - hydroxymethylene-17α-ethynylandrostan-17β-ol-3-one was prepared from 7.54 g. of 17α-ethynylandrostan-17β-ol-3-one, 11.5 ml. of ethyl formate and sodium methoxide (from 1.10 g. of sodium and 20 ml. of methanol) in 250 ml. of pyridine according to the manipulative procedure described above in Example 19, part (a). The crude product had a melting point of 171–177.5° C. (uncorr.).

(b) 17β - hydroxy-17α-ethynylandrostano[2.3-d]isoxazole [V; R is H, R' is C≡CH, X is H₂, Z is OH, Y and Y' are CH₃].—A mixture of 3.42 g. of 2-hydroxymethylene-17α-ethynylandrostan-17β-ol-3-one and 0.76 g. of hydroxylamine hydrochloride in 50 ml. of acetic acid was boiled for five minutes. The product was isolated and recrystallized successively from acetone, a benzene-acetone mixture, ethanol and ethyl acetate to give 17β-hydroxy - 17α - ethynylandrostano[2.3-d]isoxazole, M.P. 197.2–198.8° C. (corr.), $[\alpha]_D^{25} = -8.0 \pm 0.2°$ (1% in chloroform); ultraviolet maximum at 227 mμ (E=5,100).

*Analysis.*—Calcd. for $C_{22}H_{29}NO_2$: C, 77.83; H, 8.61; O, 9.43. Found: C, 77.55; H, 8.39; O, 9.70.

Example 28

(a) 2 - hydroxymethylene - 17α - propargylandrostan-17β-ol-3-one can be prepared by replacement of the 17α-methyl-4-androstan-17β-ol-3-one in Example 1, part (a) by a molar equivalent amount of 17α-propargylandrostan-17β-ol-3-one.

(b) 17β - hydroxy - 17α - propargylandrostano[2.3-d]isoxazole [V; R is H, R' is C≡CCH₃, X is H₂, Z is OH, Y and Y' are CH₃] can be prepared by replacement of the 2-hydroxymethylene-17α-methyl-4- androsten-17β-ol-3-one in Example 1, part (b) by a molar equivalent amount of 2-hydroxymethylene-17α-propargylandrostan-17β-ol-3-one.

Example 29

(a) 2 - hydroxymethylene-4-pregnene-20,21-diol-3-one can be prepared by replacement of the 17α-methyl-4-androsten-17β-ol-3-one in Example 1, part (a) by a molar equivalent amount of 4-pregnene-20,21-diol-3-one.

(b) 20,21-dihydroxy-4-pregneno[2.3-d]isoxazole [VI; R is H, R' is C(OH)CH₂OH, X is H₂, Z is H, Y and Y' are CH₃] can be prepared by replacement of the 2-hydroxymethylene-17α-methyl-4-androsten-17β-ol-3-one in Example 1, part (b) by a molar equivalent amount of 2-hydroxymethylene-4-pregnene-20,21-diol-3-one.

Example 30

(a) 2 - hydroxymethylene-9-fluoro-4-pregnene-11β,17α,21-triol-3,20-dione 20-monoethylene glycol ketal can be prepared by replacement of the 17α-methyl-4-androsten-17β-ol-3-one in Example 1, part (a) by a molar equivalent amount of 9-fluoro-4-pregnene-11β,17α,21-triol-3,20-dione 20-monoethylene glycol ketal.

(b) 9 - fluoro - 11β,17α,21-trihydroxy-20-oxo-4-pregneno[2.3-d]-isoxazole ethylene glycol ketal can be prepared by replacement of the 2-hydroxymethylene-17α-methyl-4-androsten-17β-ol-3-one in Example 1, part (b) by a molar equivalent amount of 2-hydroxymethylene-9-fluoro - 4-pregnene-11β,17α,21-triol-3,20-dione 20-monoethylene glycol ketal.

Example 31

(a) 2 - hydroxymethylene-4-pregnene-16α,17α,21-triol-3,20-dione-9β,11β-oxide 20-monoethylene glycol ketal can be prepared by replacement of the 17α-methyl-4-androsten-17β-ol-3-one in Example 1, part (a) by a molar equivalent amount of 4-pregnene-16α,17α,21-triol-3,20-dione-9β,11β-oxide 16α,21-diacetate 20-monoethylene glycol ketal.

(b) 16α,17α,21 - trihydroxy - 20-oxo-9β,11β-oxido-4-pregneno[2.3-d]-isoxazole ethylene glycol ketal can be prepared by replacement of the 2-hydroxymethylene-17α-methyl-4-androsten-17β-ol-3-one in Example 1, part (b) by a molar equivalent amount of 2-hydroxymethylene-4-pregnene - 16α,17α,21-triol-3,20-dione-9β,11β-oxide 20-monoethylene glycol ketal.

Example 32

(a) 2 - formyl-1,4-pregnadiene-17α,21-diol-3,11,20-trione 20-monoethylene glycol ketal can be prepared by replacement of the 17α-methyl-4-androsten-17β-ol-3-one in Example 1, part (a) by a molar equivalent amount of 1,4-pregnadiene-17α,21-diol-3,11,20-trione 20-monoethylene glycol ketal.

(b) 17α,21-dihydroxy-11,20-dioxo-(1,3)5-pregnatrieno[2.3-d]isoxazole 20-monoethylene glycol ketal can be prepared by replacement of the 2-hydroxymethylene-17α-methyl-4-androsten-17β-ol-3-one in Example 1, part (b) by a molar equivalent amount of 2-formyl-1,4-pregnadiene-17α,21α-diol-3,11,20-trione 20-monoethylene glycol ketal, and then hydrolyzed with dilute hydrochloric acid to give 17α,21-dihydroxy-11,20-dioxo-(1,3)5-pregnatrieno[2.3-d]isoxazole.

Example 33

(a) 2 - hydroxymethylene-17α-propynyl-6-methyl-4-androsten-17β-ol-3-one can be prepared by replacement of the 17α-methyl-4-androsten-17β-ol-3-one in Example 1, part (a) by a molar equivalent amount of 17α-propynyl-6-methyl-4-androsten-17β-ol-3-one.

(b) 17β-hydroxy-17α-propynyl-6-methyl-4-androsteno[2.3-d]isoxazole can be prepared by replacement of the 2 - hydroxymethylene-17α-methyl-4-androsten-17β-ol-3-one in Example 1, part (b) by a molar equivalent amount of 2 - hydroxymethylene-17α-propynyl-6-methyl-4-androsten-17β-ol-3-one.

Example 34

(a) 2-hydroxymethylene - 17α - methyl - 4 - androsten-17β-ol-3-one in the form of the copper chelate (2.07 g., M.P. 205–220° C.) was brominated with 1.46 g. of bromine in 100 ml. of carbon tetrachloride to give 2-bromo-2-hydroxymethylene-17α-methyl-4-androsten - 17β-ol-3-one. The latter can be dehydrobrominated by heating with collidine to give 2-formyl-17α-methyl-1,4-androstadien-17β-ol-3-one.

(b) 17β-hydroxy - 17α - methyl - (1,3)5-androstatrieno [2.3-d]isoxazole can be prepared by replacement of the 2-hydroxymethylene-17α-methyl-4-androsten-17β - ol - 3-one in Example 1, part (b) by a molar equivalent amount of 2-formyl-17α-methyl-1,4-androstadien-17β-ol-3-one.

Example 35

(a) 2-hydroxymethylene-21-acetoxy-4-pregnene - 11β, 17α-diol-3,20-dione 20-monoethylene glycol ketal can be prepared by replacement of the 17α-methyl-4-androsten-17β-ol-3-one in Example 1, part (a) by a molar equivalent amount of 21-acetoxy-4-pregnene-11β,17α-diol-3,20-dione 20-monoethylene glycol ketal (hydrocortisone acetate 20-monoethylene glycol ketal).

(b) 21-acetoxy-11β,17α-dihydroxy-20-oxo-4 - pregneno [2.3-d]isoxazole 20-monoethylene glycol ketal can be prepared by replacement of the 2-hydroxymethylene-17α-methyl-4-androsten-17β-ol-3-one in Example 1, part (b) by a molar equivalent amount of 2-hydroxymethylene-21-acetoxy-4-pregnene-11β,17α-diol - 3,20 - dione 20 - monoethylene glycol ketal, which can be hydrolyzed with methanolic potassium hydroxide to saponify the 21-acetate and then with dilute hydrochloric acid to cleave the ketal group, giving 11β,17α,21-trihydroxy-20-oxo-4-pregneno[2.3-d]isoxazole [VI; R is H, R' is COCH₂OH, X is (H)(OH), Z is OH, Y and Y' are CH₃].

Example 36

(a) 2-hydroxymethylene-21-acetoxy - 4,6 - pregnadien-17α-ol-3,11,20-trione 20-monoethylene glycol ketal can be prepared by replacement of the 17α-methyl-4-androsten-17β-ol-3-one in Example 1, part (a) by a molar equivalent amount of 21-acetoxy-4,6-pregnadien-17α-ol-3,11,20-trione 20-monoethylene glycol ketal.

(b) 21-acetoxy-17α-hydroxy-11,20-dioxo - 4,6 - pregnadieno[2.3-d]isoxazole 20-monoethylene glycol ketal can be prepared by replacement of the 2-hydroxymethylene-17α-methyl-4-androsten-17β-ol-3-one in Example 1, part (b) by a molar equivalent amount of 2-hydroxymethylene-21-acetoxy-4,6-pregnadien-17α-ol-3,11,20 - trione 20-monoethylene glycol ketal, and then hydrolyzed with dilute hydrochloric acid to give 21-acetoxy-17α-hydroxy-11,20-dioxo-4,6-pregnadieno[2.3-d]isoxazole [VII; R is H, R' is COCH₂OCOCH₃, X is O, Z is OH, Y and Y' are CH₃].

Example 37

(a) 2-hydroxymethylene-21-acetoxy-4 - pregnen - 17α-ol-3,20-dione 20-monoethylene glycol ketal can be prepared by replacement of the 17α-methyl-4-androsten-17β-ol-3-one in Example 1, part (a) by a molar equivalent amount of 21-acetoxy-4-pregnen-17α-ol-3,20-dione 20-monoethylene glycol ketal.

(b) 21-acetoxy-17α-hydroxy-20-oxo-4-pregneno[2.3-d] isoxazole 20-monoethylene glycol ketal can be prepared by replacement of the 2-hydroxymethylene-17α-methyl-4-androsten-17β-ol-3-one in Example 1, part (b) by a molar equivalent amount of 2-hydroxymethylene-21-acetoxy-4-pregnen-17α-ol-3,20-dione 20-monoethylene glycol ketal, and then hydrolyzed with dilute hydrochloric acid to give 21-acetoxy-17α-hydroxy-20-oxo-4-pregneno[2.3 - d]-isoxazole [VI; R is H, R' is COCH₂OCOCH₃, X is O, Z is OH, Y and Y' are CH₃].

Example 38

(a) 2-hydroxymethylene-21-acetoxy-6-methyl-4 - pregnen-17α-ol-3,11,20-trione 20-monoethylene glycol ketal can be prepared by replacement of the 17α-methyl-4-androsten-17β-ol-3-one in Example 1, part (a) by a molar equivalent amount of 21-acetoxy-6-methyl-4-pregnen-17α-ol-3,11,20-trione 20-monoethylene glycol ketal.

(b) 21-acetoxy-17α-hydroxy-11,20-dioxo-6-methyl - 4-pregneno[2.3-d]isoxazole 20-monoethylene glycol ketal can be prepared by replacement of the 2-hydroxymethylene-17α-methyl-4-androsten-17β-ol-3-one in Example 1, part (b) by a molar equivalent amount of 2-hydroxymethylene-21-acetoxy-6-methyl-4-pregnen - 17α - ol - 3,11,20-trione 20-monoethylene glycol ketal, and then hydrolyzed with dilute hydrochloric acid to give 21-acetoxy-17α-hydroxy-11,20-dioxo-6-methyl-4-pregneno[2.3-d]isoxazole.

Example 39

(a) 2-hydroxymethylene-21-acetoxy-9-fluoro-6 - methyl-4-pregnen-17α-ol-3,11,20-trione 20-monoethylene glycol ketal can be prepared by replacement of the 17α-methyl-4-androsten-17β-ol-3-one in Example 1, part (a) by a molar equivalent amount 21-acetoxy-9-fluoro-6-methyl-4-pregnen-17α-ol-3,11,20 - trione 20 - monoethylene glycol ketal.

(b) 21-acetoxy-17α-hydroxy-11,20-dioxo-9 - fluoro - 6-methyl-4-pregneno[2.3-d]isoxazole 20-monoethylene glycol ketal can be prepared by replacement of the 2-hydroxymethylene-17α-methyl-4-androsten-17β-ol-3 - one in Example 1, part (b) by a molar equivalent amount of 2-hydroxymethylene-21-acetoxy-9-fluoro - 6 - methyl - 4-pregnen-17α-ol-3,11,20 - trione 20 - monoethylene glycol ketal, and then hydrolyzed with dilute hydrochloric acid to give 21-acetoxy-17α-hydroxy-11,20-dioxo-9-fluoro - 6-methyl-4-pregneno[2.3-d]isoxazole.

Example 40

(a) 2-formyl-21-acetoxy-2-methyl-4-pregnen-17α - ol-3,11,20-trione 20-monoethylene glycol ketal can be prepared by replacement of the 17α-methyl-4-androsten-17β-ol-3-one in Example 1, part (a) by a molar equivalent amount of 21-acetoxy-2-methyl-4-pregnen-17α-ol-3,11,20-trione 20-monoethylene glycol ketal.

(b) 21-acetoxy-17α-hydroxy-2-methyl-11,20-dioxo - 4-pregneno[2.3-d]isoxazole 20-monoethylene glycol ketal can be prepared by replacement of the 2-hydroxymethylene-17α-methyl-4-androsten-17β-ol-3-one in Example 1, part (b) by a molar equivalent amount of 2-formyl-21-acetoxy - 2 - methyl - 4-pregnen-17α-ol-3,11,20-trione 20-monoethylene glycol ketal, and then hydrolyzed with dilute hydrochloric acid to give 21-acetoxy-17α-hydroxy-2-methyl-11,20-dioxo-4-pregneno[2.3-d]isoxazole.

Example 41

(a) 2-hydroxymethylene-21-acetoxy-4-pregnene - 11β, 16α,17α-triol-3,20-dione 20-monoethylene glycol ketal can be prepared by replacement of the 17α-methyl-4-androsten-17β-ol-3-one in Example 1, part (a) by a molar equivalent amount of 21-acetoxy-4-pregnene-11β,16α,17α-triol-3,20-dione 20-monoethylene glycol ketal.

(b) 21-acetoxy-11β,16α,17α-trihydroxy - 20 - oxo - 4-pregneno[2.3-d]isoxazole 20-monoethylene glycol ketal can be prepared by replacement of the 2-hydroxymethylene-17α-methyl-4-androsten-17β-ol-3-one in Example 1, part (b) by a molar equivalent amount of 2-hydroxymethylene-21-acetoxy-4-pregnene-11β,16α,17α-triol - 3,20-dione 20-monoethylene glycol ketal, and then hydrolyzed with dilute hydrochloric acid to give 21-acetoxy-11β,16α, 17α-trihydroxy-20-oxo-4-pregneno[2.3-d]isoxazole.

Example 42

(a) 2-hydroxymethylene-21-acetoxy-4-pregnene - 16α, 17α-diol-3,11,20-trione 20-monoethylene glycol ketal can be prepared by replacement of the 17α-methyl-4-androsten-17β-ol-3-one in Example 1, part (a) by a molar equivalent amount of 21-acetoxy-4-pregnene-16α,17α-diol-3,11,20-trione 20-monoethylene glycol ketal.

(b) *21-acetoxy-16α,17α-dihydroxy-11,20-dioxo-4-pregneno[2,3-d]-isoxazole 20-monoethylene glycol ketal* can be prepared by replacement of the 2-hydroxymethylene-17α-methyl-4-androsten-17β-ol-3-one in Example 1, part (b) by a molar equivalent amount of 2-hydroxymethylene-21-acetoxy-4-pregnene-16α,17α-diol - 3,11,20 - trione 20-monoethylene glycol ketal, and then hydrolyzed with dilute hydrochloric acid to give 21-acetoxy-16α,17α-dihydroxy-11,20-dioxo-4-pregneno[2.3-d]isoxazole.

*Example 43*

(a) *2-hydroxymethylene-4,17(20)-pregnadiene-11β,21-diol-3-one* can be prepared by replacement of the 17α-methyl-4-androsten-17β-ol-3-one in Example 1, part (a) by a molar equivalent amount of 4,17(20)-pregnadiene-11β,21-diol-3-one.

(b) *11β,21-dihydroxy - 4,17(20) - pregnadieno[2.3-d] isoxazole* can be prepared by replacement of the 2-hydroxymethylene - 17α - methyl-4-androsten-17β-ol-3-one in Example 1, part (b) by a molar equivalent amount of 2-hydroxymethylene - 4,17(20) - pregnadiene-11β,21-diol-3-one.

*Example 44*

*11β,17α,21 - trihydroxy - 20 - oxo-4-pregneno[2.3-d] isoxazole* (Example 35) can be caused to react with p-toluenesulfonyl chloride in pyridine under mild conditions to give 21-tosyloxy - 11β,17α - dihydroxy-20-oxo-4-pregneno[2.3-d]isoxazole. The latter can be caused to react with sodium bromide, sodium iodide, sodium chloride or sodium thiocyanate to give, respectively, 21-bromo, 21-iodo, 21-chloro or 21-thiocyano derivatives of 11β,17α-dihydroxy-20-oxo-4-pregneno[2.3-d]isoxazole.

*Example 45*

(a) *2-hydroxymethyleneandrostane-6β,17β-diol - 3 - one* can be prepared by replacement of the 17α-methyl-4-androsten-17β-ol-3-one in Example 1, part (a) by a molar equivalent amount of androstane-6β,17β-diol-3-one.

(b) *6β,17β-dihydroxyandrostano[2.3-d]isoxazole* can be prepared by replacement of the 2-hydroxymethylene-17α-methyl-4-androsten-17β-ol-3-one in Example 1, part (b) by a molar equivalent amount of 2-hydroxymethylene-androstane-6β,17β-diol-3-one.

*Example 46*

(a) *2-hydroxymethylene-17α-ethynyl-4-androsten-17β-ol-3,11-dione* can be prepared by replacement of the 17α-methyl-4-androsten-17β-ol-3-one in Example 1, part (a) by a molar equivalent amount of 17α-ethynyl-4-androsten-17β-ol-3,11-dione.

(b) *17α-ethynyl-17β-hydroxy-11 - oxo - 4 - androsteno [2.3-d]isoxazole* [VI; R is H, R′ is C≡CH, X is O, Z is OH, Y and Y′ are CH₃] can be prepared by replacement of the 2-hydroxymethylene-17α-methyl-4-androsten-17β-ol-3-one in Example 1, part (b) by a molar equivalent amount of 2-hydroxymethylene-17a-ethynyl-4-androsten-17β-ol-3,11-dione.

*Example 47*

(a) *2 - hydroxymethylene-17α-methyl-4-androsten-17β-ol-3,11-dione* can be prepared by replacement of the 17α-methyl-4-androsten-17β-ol-3-one in Example 1, part (a) by a molar equivalent amount of 17α-methyl-4-androsten-17β-ol-3,11-dione.

(b) *17α - methyl-17β-hydroxy-11-oxo - 4 - androsteno [2.3-d]isoxazole* [VI; R is H, R′ is CH₃, X is O, Z is OH, Y and Y′ are CH₃] can be prepared by replacement of the 2-hydroxymethylene-17α-methyl-4-androsten-17β-ol-3-one in Example 1, part (b) by a molar equivalent amount of 2-hydroxymethylene-17α-methyl-4-androsten-17β-ol-3,11-dione.

*Example 48*

(a) *2-hydroxymethylene-4-androsten-17β-ol-3,11-dione* can be prepared by replacement of the 17α-methyl-4-androsten-17β-ol-3-one in Example 1, part (a) by a molar equivalent amount of 4-androsten-17β-ol-3,11-dione.

(b) *17β - hydroxy-11-oxo-4-androsteno[2.3-d]isoxazole* [VI; R and R′ are H, X is O, Z is OH, Y and Y′ are CH₃] can be prepared by replacement of the 2-hydroxymethylene - 17α - methyl-4-androsten-17β-ol-3-one in Example 1, part (b) by a molar equivalent amount of 2-hydroxymethylene-4-androsten-17β-ol-3,11-dione.

*Example 49*

(a) *2 - hydroxymethylene-4-androstene-6β,17β-diol-3-one* can be prepared by replacement of the 17α-methyl-4-androsten-17β-ol-3-one in Example 1, part (a) by a molar equivalent amount of 4-androstene-6β,17β-diol-3-one.

(b) *6β,17β-dihydroxy-4-androsteno[2.3-d]isoxazole* can be prepared by replacement of the 2-hydroxymethylene-17α-methyl-4-androsten-17β-ol-3-one in Example 1, part (b) by a molar equivalent amount of 2-hydroxymethylene-4-androstene-6β,17β-diol-3-one.

*Example 50*

(a) *2 - hydroxymethylene-17α-methyl - 4 - androstene-6β,17β-diol-3-one* can be prepared by replacement of the 17α-methyl-4-androsten-17β-ol-3-one in Example 1, part (a) by a molar equivalent amount of 17a-methyl-4-androstene-6β,17β-diol-3-one.

(b) *17α-methyl-6β,17β-dihydroxy-4-androsteno[2.3-d] isoxazole* can be prepared by replacement of the 2-hydroxymethylene-17α-methyl-4-androsten-17β-ol-3-one in Example 1, part (b) by a molar equivalent amount of 2-hydroxymethylene - 17a - methyl-4-androstene - 6β,17β-diol-3-one.

*Example 51*

(a) *2 - hydroxymethylene-4-androstene-14α,17β-diol-3-one* can be prepared by replacement of the 17α-methyl-4-androsten-17β-ol-3-one in Example 1, part (a) by a molar equivalent amount of 4-androstene-14α,17β-diol-3-one.

(b) *14α,17β-dihydroxy - 4 - androsteno[2.3-d]isoxazole* can be prepared by replacement of the 2-hydroxymethylene-17α-methyl-4-androsten-17β-ol-3-one in Example 1, part (b) by a molar equivalent amount of 2-hydroxymethylene-4-androstene-14α,17β-diol-3-one.

*Example 52*

(a) *2 - hydroxymethylene-16β-methyl-4-androsten-17β-ol-3-one* can be prepared by replacement of the 17α-methyl-4-androsten-17β-ol-3-one in Example 1, part (a) by a molar equivalent amount of 16β-methyl-4-androsten-17β-ol-3-one.

(b) *16β-methyl - 17β - hydroxy - 4 - androsteno[2.3-d] isoxazole* can be prepared by replacement of the 2-hydroxymethylene-17α-methyl-4-androsten-17β-ol-3 - one in Example 1, part (b) by a molar equivalent amount of 2-hydroxymethylene-16β-methyl-4-androsten - 17β - ol - 3-one.

*Example 53*

(a) *2 - hydroxymethylene-4-androstene-11α,17β-diol-3-one* can be prepared by replacement of the 17α-methyl-4-androsten-17β-ol-3-one in Example 1, part (a) by a molar equivalent amount of 4-androstene-11α,17β-diol-3-one.

(b) *11α,17β - dihydroxy-4-androsteno[2.3-d]isoxazole* [VI; R and R′ are H, X is (H)(OH), Z is OH, Y and Y′ are CH₃] can be prepared by replacement of the 2-hydroxymethylene - 17α-methyl-4-androsten-17β-ol-3-one in Example 1, part (b) by a molar equivalent amount of 2-hydroxymethylene-4-androstene-11α-17β-diol-3-one.

Example 54

(a) 2 - hydroxymethylene-19-nor-4-androstene-6β,17β-diol-3-one can be prepared by replacement of the 17α-methyl-4-androsten-17β-ol-3-one in Example 1, part (a) by a molar equivalent amount of 19-nor-4-androstene-6β,17β-diol-3-one.

(b) 6β,17β - dihydroxy - 19 - nor-4-androsteno[2.3-d] isoxazole can be prepared by replacement of the 2-hydroxymethylene - 17α-methyl-4-androsten-17β-ol-3-one in Example 1, part (b) by a molar equivalent amount of 2-hydroxymethylene-19-nor-4-androstene-6β,17β-diol-3-one.

Example 55

(a) 2 - hydroxymethylene - 4-bromo-17α-methyl-4-androsten-17β-ol-3-one can be prepared by replacement of the 17α-methyl-4-androsten-17β-ol-3-one in Example 1, part (a) by a molar equivalent amount of 4-bromo-17α-methyl-4-androsten-17β-ol-3-one.

(b) 4 - bromo - 17α-methyl-17β-hydroxy-4-androsteno [2.3-d]isoxazole can be prepared by replacement of the 2 - hydroxymethylene - 17α-methyl-4-androsten-17β-ol-3-one in Example 1, part (b) by a molar equivalent amount of 2-hydroxymethylene-4-bromo-17α-methyl-4-androsten-17β-ol-3-one.

Example 56

(a) 2 - hydroxymethylene - 4-methyl-4-androsten-17β-ol-3-one can be prepared by replacement of the 17α-methyl-4-androsten-17β-ol-3-one in Example 1, part (a) by a molar equivalent amount of 4-methyl-4-androsten-17β-ol-3-one.

(b) 4 - methyl - 17β-hydroxy-4-androsteno[2.3-d]isoxazole can be prepared by replacement of the 2-hydroxymethylene-17a-methyl-4-androsten-17β-ol-3-one in Example 1, part (b) by a molar equivalent amount of 2-hydroxymethylene-4-methyl-4-androsten-17β-ol-3-one.

Example 57

(a) 2 - hydroxymethylene-4,17α-dimethyl-4-androsten-17β-ol-3-one can be prepared by replacement of the 17α-methyl-4-androsten-17β-ol-3-one in Example 1, part (a) by a molar equivalent amount of 4,17α-dimethyl-4-androsten-17β-ol-3-one.

(b) 4,17 - dimethyl-17β-hydroxy-4-androsteno[2.3-d] isoxazole can be prepared by replacement of the 2-hydroxymethylene - 17α-methyl-4-androsten-17β-ol-3-one in Example 1, part (b) by a molar equivalent amount of 2-hydroxymethylene - 4,17α-dimethyl-4-androsten-17β-ol-3-one.

Example 58

(a) 2-hydroxymethylene-17α-ethynyl-4,6-androstadien-17β-ol-3-one can be prepared by replacement of the 17α-methyl-4-androsten-17β-ol-3-one in Example 1, part (a) by a molar equivalent amount of 17α-ethynyl-4,6-androstadien-17β-ol-3-one.

(b) 17α-ethynyl-17β-hydroxy-4,6-androstadieno[2.3-d] isoxazole [VII; R is H, R' is C≡CH, X is H$_2$, Z is OH, Y and Y' are CH$_3$] can be prepared by replacement of the 2-hydroxymethylene-17a-methyl-4-androsten-17β-ol-3-one in Example 1, part (b) by a molar equivalent amount of 2-hydroxymethylene-17α-ethynyl-4,6-androstadien-17β-ol-3-one.

Example 59

(a) 2 - hydroxymethyleneallopregnane-6β,17α,21-triol-3,20-dione 20-monoethylene glycol ketal can be prepared by replacement of the 17α-methyl-4-androsten-17β-ol-3-one in Example 1, part (a) by a molar equivalent amount of allopregnane-6β,17α,21-triol-3,20-dione 20-monoethylene glycol ketal.

(b) 6β,17α,21 - trihydroxy-20-oxoallopregnano[2.3-d] isoxazole 20-monoethylene glycol ketal can be prepared by replacement of the 2-hydroxymethylene-17α-methyl-4-androsten-17β-ol-3-one in Example 1, part (b) by a molar equivalent amount of 2-hydroxymethyleneallopregnane-6β,17α,21-triol-3,20-dione 20-monoethylene glycol ketal, and then hydrolyzed wtih dilute hydrochloric acid to give 6β,17α,21 - trihydroxy - 20 - oxoallopregnano[2.3-d]isoxazole.

Example 60

(a) 2 - hydroxymethylene - 21-acetoxy-4-pregnene-12α,17α-diol-3,20-dione 20-monoethylene glycol ketal can be prepared by replacement of the 17α-methyl-4-androsten-17β-ol-3-one in Example 1, part (a) by a molar equivalent amount of 21acetoxy-4-pregnene-12α,17α-diol-3,20-dione 20-monoethylene glycol ketal.

(b) 21 - acetoxy-12α,17α-dihydroxy-20-oxo-4-pregneno [2.3-d]isoxazole 20-monoethylene glycol ketal can be prepared by replacement of the 2-hydroxymethylene-17α-methyl-4-androsten-17β-ol-3-one in Example 1, part (b) by a molar equivalent amount of 2-hydroxymethylene-21-acetoxy - 4 - pregnene-12α,17α-diol-3,20-dione 20-monoethylene glycol ketal, and then hydrolyzed with dilute hydrochloric acid to give 21-acetoxy-12α,17α-dihydroxy-20-oxo-4-pregneno[2.3d]isoxazole.

Example 61

(a) 2 - hydroxymethylene-21-acetoxyallopregnan-17α-ol-3,12,20-trione 20-monoethylene glycol ketal can be prepared by replacement of the 17α-methyl-4-androsten-17β-ol-3-one in Example 1, part (a) by a molar equivalent amount of 21 - acetoxyallopregnan-17α-ol-3,12,20-trione 20-monoethylene glycol ketal.

(b) 21 - acetoxy-17α-hydroxy-12,20-dioxoallopregnano [2.3-d]isoxazole 20-monoethylene glycol ketal can be prepared by replacement of the 2-hydroxymethylene-17α-methyl-4-androsten-17β-ol-3-one in Example 1, part (b) by a molar equivalent amount of 2-hydroxymethylene-21-acetoxyallopregnan - 17α-ol-3-12,20-trione 20-monoethylene glycol ketal, and then hydrolyzed with dilute hydrochloric acid to give 21-acetoxy-17α-hydroxy-12,20-dioxoallopregnano[2.3-d]-isoxazole.

Example 62

(a) 2 - hydroxymethylene-4,11-pregnadiene-3,20-dione 20-monoethylene glycol ketal can be prepared by replacement of the 17α-methyl-4-androsten-17β-ol-3-one in Example 1, part (a) by a molar equivalent amount of 4,11-pregnadiene-3,20-dione 20-monoethylene glycol ketal.

(b) 20 - oxo - 4,11 - pregnadieno[2.3-d]isoxazole 20-monoethylene glycol ketal can be prepared by replacement of the 2-hydroxymethylene-17α-methyl-4-androsten-17β-ol-3-one in Example 1, part (b) by a molar equivalent amount of 2-hydroxymethylene-4,11-pregnadiene-3,20-dione 20-monoethylene glycol ketal, and then hydrolyzed with dilute hydrochloric acid to give 20-oxo-4,11-pregnadieno[2.3-d]isoxazole.

Example 63

(a) 2 - hydroxymethylene - 4 - pregnen - 17α - ol - 3,-20-dione 20-monoethylene glycol ketal can be prepared by replacement of the 17α-methyl-4-androsten-17β-ol-3-one in Example 1, part (a) by a molar equivalent amount of 4-pregnen-17α-ol-3,20-dione 20-monoethylene glycol ketal.

(b) 17α - hydroxy - 20 - oxo - 4 - pregneno[2.3-d]isoxazole 20-monoethylene glycol ketal can be prepared by replacement of the 2-hydroxy-methylene-17α-methyl-4-androsten-17β-ol-3-one in Example 1, part (b) by a molar equivalent amount of 2-hydroxymethylene-4-pregnen-17α-ol-3,20-dione 20-monoethylene glycol ketal, and then hydrolyzed with dilute hydrochloric acid to give 17α-hydroxy-20-oxo-4-pregneno[2.3-d]isoxazole [VI; R is H, R' is COCH$_3$, X is H$_2$, Z is OH, Y and Y' are CH$_3$].

Example 64

(a) 2 - hydroxymethylene - 17α - methyl - 4 - pregnene-3,20-dione 20-monoethylene glycol ketal can be prepared by replacement of the 17α-methyl-4-androsten-17β-ol-3- one in Example 1, part (a) by a molar equivalent amount of 17α-methyl-4-pregnene-3,20-dione 20-monoethylene glycol ketal.

(b) *17α - methyl - 20 - oxo - 4 - pregneno[2.3 - d]isoxazole 20-monoethylene glycol ketal* can be prepared by replacement of the 2-hydroxymethylene-17α-methyl-4-androsten-17β-ol-one in Example 1, part (b) by a molar equivalent amount of 2-hydroxymethylene-17α-methyl-4-pregnene-3,20-dione 20-monoethylene glycol ketal, and then hydrolyzed with dilute hydrochloric acid to give 17α-methyl-20-oxo-4-pregneno[2.3-d]isoxazole.

Example 65

(a) *2 - hydroxymethylene - 4 - pregnen - 6β - ol - 3,20-dione 20-monoethylene glycol ketal* can be prepared by replacement of the 17β-methyl-4-androsten-17β-ol-3-one in Example 1, part (a) by a molar equivalent amount of 4-pregnen-6β-ol-3,20-dione 20-monoethylene glycol ketal.

(b) *6β hydroxy - 20 - oxo - 4 - pregneno[2.3 - d]isoxazole 20-monoethylene glycol ketal* can be prepared by replacement of the 2-hydroxymethylene-17α-methyl-4-androsten-17β-ol-one in Example 1, part (b) by a molar equivalent amount of 2-hydroxymethylene-4-pregnen-6β-ol-3,20-dione 20-monoethylene glycol ketal, and then hydrolyzed with dilute hydrochloric acid to give 6β-hydroxy-20-oxo-4-pregneno[2.3-d]isoxazole.

Example 66

(a) *2 - Hydroxymethylene - 4 - pregnene - 7β,11β-diol-3,20-dione-20-monoethylene glycol ketal* can be prepared by replacement of the 17α-methyl-4-androsten-17β-ol-3-one in Example 1, part (a) by a molar equivalent amount of 4-pregnene-7β,11β-diol-3,20-dione 20-monoethylene glycol ketal.

(b) *7β,11β - dihydroxy - 20- oxo - 4 - pregneno[2.3-d]isoxazole 20-monoethylene glycol ketal* can be prepared by replacement of the 2-hydroxymethylene-17α-methyl-4-androstan-17β-ol-3-one in Example 1, part (b) by a molar equivalent amount of 2-hydroxymethylene-4-pregnene-7β,11β-diol-3,20-dione 20-monoethylene glycol ketal, and then hydrolyzed with dilute hydrochloric acid to give 7β,11β-dihydroxy-20-oxo-4-pregneno[2.3-d]-isoxazole.

Example 67

(a) *2 - hydroxymethylene - 12α - chloro - 4 - pregnene-17α,21-diol-3,11,20-trione 20-monoethylene glycol ketal* can be prepared by replacement of the 17α-methyl-4-androsten-17β-ol-3-one in Example 1, part (a) by a molar equivalent amount of 12α-chloro-4-pregnene-17α,21-diol-3,11,20-trione 20-monoethylene glycol ketal.

(b) *12α - chloro - 17α,21 - dihydroxy - 11,20 - dioxo-4-pregneno[2.3-d]-isoxazole 20-monoethylene glycol ketal* can be prepared by replacement of the 2-hydroxymethylene-17α-methyl-4-androsten-17β-ol-3-one in Example 1, part (b) by a molar equivalent amount of 2-hydroxymethylene - 12α - chloro - 4 - pregnene - 17α,21-diol-3,11,20-trione 20-monoethylene glycol ketal, and then hydrolyzed with dilute hydrochloric acid to give 12α-chloro - 17α,21 - dihydroxy - 11,20 - dioxo - 4 - pregneno [2.3-d]isoxazole.

Example 68

(a) *2 - hydroxymethylene - 18,19 - bisnor - 4 - pregnene-3,20-dione 20-monoethylene glycol ketal* can be prepared by replacement of the 17α-methyl-4-androsten-17β-ol-3-one in Example 1, part (a) by a molar equivalent amount of 18,19-bisnor-4-pregnene-3,20-dione 20-monoethylene glycol ketal.

(b) *20 - oxo - 18,19 - bisnor - 4 - pregneno[2.3-d] isoxazole 20-monoethylene glycol ketal* can be prepared by replacement of the 2-hydroxy-methylene-17α-methyl-4-androsten-17β-ol-3-one in Example 1, part (b) by a molar equivalent amount of 2-hydroxymethylene-18,19-bisnor-4-pregnene-3,20-dione 20-monoethylene glycol ketal, and then hydrolyzed with dilute hydrochloric acid to give 20-oxo-18,19-bisnor-4-pregneno[2.3-d]isoxazole [VI; R is H, R' is COCH₃, X is H₂, Z is H, Y and Y' are H].

Example 69

(a) *2 - hydroxymethylene - 21 - acetoxy - 4 - bromo-4-pregnen-17α-ol-3,11,20-trione 20-monoethylene glycol ketal* can be prepared by replacement of the 17α-methyl-4-androsten-17β-ol-3-one in Example 1, part (a) by a molar equivalent amount of 21-acetoxy-4-bromo-4-pregnen-17α-ol-3,11,20-trione 20-monoethylene glycol ketal.

(b) *21 - acetoxy - 4 - bromo - 17α - hydroxy - 11,20-dioxo-4-pregneno[2.3-d]isoxazole 20-monoethylene glycol ketal* can be prepared by replacement of the 2-hydroxymethylene-17α-methyl-4-androstan-17β-ol-3-one in Example 1, part (b) by a molar equivalent amount of 2-hydroxymethylene - 21 - acetoxy - 4 - bromo - 4 - pregnen-17α-ol-3,11,20-trione 20-monoethylene glycol ketal, and then hydrolyzed with dilute hydrochloric acid to give 21 - acetoxy - 4 - bromo - 17α - hydroxy - 11,20 - dioxo-4-pregneno[2.3-d]isoxazole.

Example 70

(a) *2 - hydroxymethylene - 4 - pregnene - 7α,12α-diol-3,20-dione 20-monoethylene glycol ketal* can be prepared by replacement of the 17α-methyl-4-androsten-17β-ol-3-one in Example 1, part (a) by a molar equivalent amount of 4-pregnene-7α,12α-diol-3,20-dione 20-monoethylene glycol ketal.

(b) *7α,12α - dihydroxy - 20 - oxo - 4 - pregneno[2.3-d]isoxazole 20-monoethylene glycol ketal* can be prepared by replacement of the 2-hydroxymethylene-17α-methyl-4-androsten-17β-ol-3-one in Example 1, part (b) by a molar equivalent amount of 2-hydroxymethylene-4-pregnene-7α,12α-diol-3,20-dione 20-monoethylene glycol ketal, and then hydrolyzed with dilute hydrochloric acid to give 7α,12α-dihydroxy-20-oxo-4-pregneno[2.3-d]isoxazole.

Example 71

(a) *2 - hydroxymethyleneallopregnane - 3,7,20 - trione 7,20-bis(ethylene glycol ketal)* can be prepared by replacement of the 17α-methyl-4-androsten-17β-ol-3-one in Example 1, part (a) by a molar equivalent amount of allopregnane-3,7,20-trione 7,20-bis(ethylene glycol ketal) (prepared by ketalization of allopregnan-3β-ol-7,20-dione and oxidation by the Oppenauer procedure).

(b) *7,20-dioxoallopregnano[2.3-d]isoxazole 7,20-bis-(ethylene glycol ketal)* can be prepared by replacement of the 2-hydroxymethylene-17α-methyl-4-androsten-17β-ol-3-one in Example 1, part (b) by a molar equivalent amount of 2-hydroxymethyleneallopregnane-3,7,20-trione 7,20-bis(ethylene glycol ketal), and then hydrolyzed with dilute hydrochloric acid to give 7,20-dioxoallopregnano-[2.3-d]isoxazole.

Example 72

(a) *2-formyl-9α-fluoro-16α - methyl - 1,4 - pregnadiene-11β,17α,21-triol-3,20-dione 20-monoethylene glycol ketal* can be prepared by replacement of the 17α-methyl-4-androsten-17β-ol-3-one in Example 1, part (a) by a molar equivalent amount of 9α-fluoro-16α-methyl-1,4-pregnadiene-11β,17α,21-triol-3,20-dione 20-monoethylene glycol ketal.

(b) *9α-fluoro-16α-methyl - 11β,17α,21 - trihydroxy-20-oxo-(1,3)5-pregnatrieno[2.3-d]isoxazole 20-ethylene glycol ketal* can be prepared by replacement of the 2-hydroxymethylene-17α-methyl-4-androsten-17β-ol-3 - one in Example 1, part (b) by a molar equivalent amount of 2 - formyl - 9α - fluoro - 16α - methyl - 1,4 - pregnadiene-11β,17α,21-triol-3,20-dione 20-monoethylene glycol ketal, and then hydrolyzed with dilute hydrochloric acid to give 9α-fluoro-16α-methyl-11β, 17α, 21 - trihydroxy - 20 - oxo-(1,3)5-pregnatrieno[2.3-d]isoxazole.

Example 73

(a) 2 - formyl-6α,9α-difluoro-1,4-pregnadiene-11β, 17α, 21-triol-3,20-dione 20-monoethylene glycol ketal can be prepared by replacement of the 17α-methyl-4-androsten-17β-ol-3-one in Example 1, part (a) by a molar equivalent amount of 6α,9α-difluoro-1,4-pregnadiene-11β,17α,21-triol-3,20-dione 20-monoethylene glycol ketal.

(b) 6α,9α - difluoro - 11β,17α,21 - trihydroxy - 20 - oxo - (1,3)5-pregnatrieno[2.3-d]isoxazole 20 - ethylene glycol ketal can be prepared by replacement of the 2-hydroxymethylene - 17α - methyl-4-androsten-17β-ol-3-one in Example 1, part (b) by a molar equivalent amount of 2-formyl-6α,9α-difluoro-1,4-pregnadiene-11β, 17α,21 - triol-3,20-dione 20-monoethylene glycol ketal, and then hydrolyzed with dilute hydrochloric acid to give 6α,9α-difluoro - 11β,17α,21 - trihydroxy - 20 - oxo - (1,3)5 - pregnatrieno[2.3-d]isoxazole.

The following compounds were prepared according to the methods previously described:

Example 74

6α,17α - dimethyl - 17β - hydroxyandrostano[2.3 - d]-isoxazole, M.P. 161.4–166.2° C. (corr.), $[\alpha]_D^{25}$=47.8 ±0.4° (1% in chloroform); ultraviolet maximum at 228 mµ (E=4,800).

*Analysis.*—Calcd. for $C_{22}H_{33}NO_2$: C, 76.92; H, 9.68; N, 4.08. Found: C, 77.04; H, 9.75; N, 3.99.

Example 75

17β - hydroxy - 17α - propyl - 4 - androsteno[2.3 - d]-isoxazole [VI; R is H, R' is $(CH_2)_2CH_3$, X is $H_2$, Z is OH, Y and Y' are $CH_3$], M.P. 122.6–127.8° C. (corr.), $[\alpha]_D^{25}$=+79.7±0.2° (1% in chloroform); ultraviolet maximum at 286 mµ (E=10,200).

*Analysis.*—Calcd. for $C_{23}H_{33}NO_2$: N, 3.94; O, 9.00. Found: N, 3.82; O, 9.15.

Example 76

17α-allyl-17β - hydroxy - 4 - androsteno[2.3-d]isoxazole [VI; R is H, R' is $CH_2CH=CH_2$, X is $H_2$, Z is OH, Y and Y' are $CH_3$], M.P. 152.2–156.0° C. (corr), $[\alpha]_D^{25}$=85.0±0.1° (1% in chloroform); ultraviolet maximum at 286 mµ (E=12,200).

*Analysis.*—Calcd. for $C_{23}H_{31}NO_2$: C, 78.14; H, 8.84; O, 9.05. Found: C, 78.37; H, 8.82; O, 9.10.

Example 77

17β - hydroxy - 17α - propargyl - 4 - androsteno[2.3-d]-isoxazole [VI; R is H, R' is $CH_2C≡CH$, X is $H_2$, Z is OH, Y and Y' are $CH_3$], pale yellow prisms, M.P. 182.0–187.6° C. (corr.), $[\alpha]_D^{25}$=+72.6° (1% in chloroform); ultraviolet maximum at 285 mµ (E=11,227).

*Analysis.*—Calcd. for $C_{23}H_{29}NO_2$: C, 78.59; H, 8.32; N, 3.99. Found: C, 78.27; H, 8.06; N, 3.97.

Example 78

4,4,17,17-tetramethyl-18-nor-5,12-androstadieno[2.3-d]-isoxazole, M.P. 164.2–166.2° C. (corr.), $[\alpha]_D^{25}$=−175° (1% in chloroform); ultraviolet maximum at 225 mµ (E=6,400). This compound was formed by reacting 2 - hydroxymethylene - 4,4,17α - trimethyl - 5 - androsten-17β-ol-3-one with hydroxylamine hydrochloride in acetic acid, rearrangement occurring in a manner analogous to that of Example 17.

*Analysis.*—Calcd. for $C_{23}H_{31}NO$: C, 81.85; H, 9.26; O, 4.74. Found: C, 81.93; H, 9.29; O, 5.10.

Example 79

17β - hydroxy - 17α - propynyl - 4 - androsteno[2.3-d]-isoxazole [VI; R is H, R' is C≡CCH_3, X is $H_2$, Z is OH, Y and Y' are $CH_3$], obtained with one molecule of ethanol of crystallization, M.P. 138.6–144.2° C. (corr.), $[\alpha]_D^{25}$=−8.3° (1% in chloroform); ultraviolet maximum at 284 mµ (E=9,600).

*Analysis.*—Calcd. for $C_{23}H_{29}NO_2·C_2H_5OH$: C, 75.52; H, 8.87; O, 12.07. Found: C, 75.50; H, 8.53; O, 12.30.

Example 80

17β-hydroxy-17α-propylandrostano[2.3-d]isoxazole [V; R is H, R' is $CH_2CH_2CH_3$, X is $H_2$, Z is OH, Y and Y' are $CH_3$], colorless elongated prisms, M.P. 163.2–168.2° C. (corr.), $[\alpha]_D^{25}$=+31.9° (1% in chloroform); ultraviolet maximum at 224 mµ (E=4,000).

*Analysis.*—Calcd. for $C_{23}H_{35}NO_2$: C, 77.27; H, 9.87; O, 8.95. Found: C, 77.55; H, 9.69; O, 8.65.

Example 81

17β - hydroxy - 17α - methyl - 19 - nor - 4 - androsteno-[2.3-d]isoxazole [VI; R is H, R' is $CH_3$, X is $H_2$, Z is OH, Y is H, Y' is $CH_3$], pale yellow needles, M.P. 158.0–165.4° C. (corr.), $[\alpha]_D^{25}$=−44.9° (1% in chloroform).

*Analysis.*—Calcd. for $C_{20}H_{27}NO_2$: C, 76.64; H, 8.69; N, 4.47. Found: C, 76.57; H, 8.63; N, 4.44.

17β - hydroxy - 17α - methyl - 19 - nor - 4 - androsteno-[2.3-d]isoxazole was found to possess anabolic activity and myotrophic activity with a low degree of androgenic activity; and it also was found to possess a high degree of progestational activity when administered intramuscularly to estrogen-primed immature female rabbits at a dose level of 2.0 mg./kg.

Example 82

17β - hydroxy-17α-propynylandrostano[2.3-d]isoxazole [V; R is H, R' is C≡CCH_3, X is $H_2$, Z is OH, Y and Y' are $CH_3$], M.P. 124.6–135.4° C. (corr.), $[\alpha]_D^{25}$=−18.5° (1% in chloroform); ultraviolet maximum at 227 mµ (E=5,300).

*Analysis.*—Calcd. for $C_{23}H_{31}NO_2$: C, 78.14; H, 8.84; O, 9.05. Found: C, 77.85; H, 9.13; O, 9.15.

Example 83

(a) 2 - hydroxymethylene - 9α - fluoro - 4 - pregnene-11β,17α,21-triol - 3,20 - dione 17,20;20,21-bismethylenedioxy derivative was prepared from 8.54 g. of 9α-fluorohydrocortisone 17,20;20,21-bismethylenedioxy derivative, 24 ml. of ethyl formate and 1.2 g. of sodium hydride in benzene according to the manipulative procedure described above in Example 1, part (a).

(b) 9α - fluoro - 11β,17α,21 - trihydroxy - 20 - oxo - 4-pregneno[2.3-d]isoxazole 17,20;20,21-bismethylenedioxy derivative was prepared from 6.2 g. of 2-hydroxymethylene-9α-fluoro-4-pregnene-11β,17α,21-triol-3,20-dione 17,20;20,21-bismethylenedioxy derivative, 2.00 g. of hydroxylamine hydrochloride and 2.00 g. of fused sodium acetate in acetic acid according to the manipulative procedure described above in Example 1, part (b). The product was obtained in the form of a pale yellow solid, M.P. 280–290° C. (uncorr.) when recrystallized from a benzene-ethanol mixture.

*Analysis.*—Calcd. for $C_{24}H_{30}FNO_6$: C, 64.43; H, 6.76. Found: C, 64.78; H, 6.70.

(c) 21 - acetoxy - 9α - fluoro - 11β,17α - dihydroxy-20-oxo-4-pregneno[2.3-d]isoxazole was prepared from 1.25 g. of 9α-fluoro-11β,17α,21-trihydroxy-20-oxo-4-pregneno[2.3-d]isoxazole 17,20;20,21-bismethylenedioxy derivative, 40 ml. of acetic acid and 4 ml. of perchloric acid, seven hours at room temperature. The product was isolated and acetylated with acetic anhydride in pyridine and recrystallized from methanol to give 21-acetoxy-9α-fluoro - 11β,17α - dihydroxy - 20 - oxo - 4 - pregneno[2.3-d]-isoxazole, yellow crystals, M.P. 204–227.2° C. (dec.) (corr.), $[\alpha]_D^{25}$=+157.6° (1% in chloroform).

*Analysis.*—Calcd. for $C_{24}H_{30}FNO_6$: C, 64.43; H, 6.76; F, 4.25; N, 3.13. Found: C, 64.27; H, 6.80; F, 4.34; N, 3.02.

Example 84

(a) 2 - hydroxymethylene - 4 - pregnene - 11β,17α - tri-ol-3,20-dione 17,20;20,21-bismethylenedioxy derivative was prepared from 12.6 g. of hydrocortisone 17,20;20,21-bismethylenedioxy derivative, 22 ml. of ethyl formate and 2.2 g. of sodium hydride in benzene according to the manipulative procedure described above in Example 1, part (a).

(b) 11β,17α,21 - trihydroxy - 20 - oxo - 4 - pregneno-[2.3-d]isoxazole 17,20;20,21-bismethylenedioxy derivative was prepared from 10.6 g. of 2-hydroxymethylene-4-pregnene - 11β,17α,21 - triol - 3,20-dione 17,20;20,21-bismethylenedioxy derivative, 2.5 g. of hydroxylamine hydrochloride and 2.5 g. of fused sodium acetate in acetic acid according to the manipulative procedure described above in Example 1, part (b). There was thus obtained 5.1 g. of 11β,17α,21-trihydroxy-20-oxo-4-pregneno[2.3-d]isoxazole 17,20;20,21 - bismethylenedioxy derivative, M.P. 271–274° C. (uncorr.) when recrystallized from a benzene-ethanol mixture.

(c) 11β,17α,21 - trihydroxy - 20 - oxo - 4 - pregneno-[2.3-d]isoxazole [VI; R is H, R' is COCH$_2$OH, X is (H)(OH), Z is OH, Y and Y' are CH$_3$] was prepared from 5.1 g. of 11β,17α,21-trihydroxy-20-oxo-4-pregneno-[2.3-d]isoxazole 17,20;20,21-bismethylenedioxy derivative, 200 ml. of acetic acid and 20 ml. of perchloric acid, five hours at room temperature. The resulting product was treated with a solution of potassium bicarbonate in aqueous methanol to hydrolyze any 21-ester produced, and the product purified by chromatography on silica gel to give 11β,17α,21-trihydroxy-20-oxo-4-pregneno[2.3-d]-isoxazole, pale cream prisms from ethyl acetate-benzene, M.P. 226.8–236° C. (Corr.), $[\alpha]_D^{25}=+146.4°$ (1% in chloroform).

Analysis.—Calcd. for C$_{22}$H$_{29}$NO$_5$: C, 68.19; H, 7.54; N, 3.62. Found: C, 67.99; H, 7.59; N, 3.77.

Example 85

(a) 2 - hydroxymethylene - 4,4 - dimethyl - 5 - pregnene-3,20-dione 20-monoethylene glycol ketal was prepared from 4,4-dimethyl-5-pregnene-3,20-dione 20-monoethylene glycol ketal, ethyl formate and sodium hydride in benzene according to the manipulative procedure described above in Example 1, part (a). The product was recrystallized from ethyl acetate as a peach-colored solid and had the M.P. 182.2–183.4° C. (corr.), $[\alpha]_D^{25}=-14.6°$ (1% in chloroform).

Analysis.—Calcd. for C$_{26}$H$_{38}$O$_4$: C, 75.32; H, 9.24; O, 15.44. Found: C, 75.00; H, 9.55; O, 15.70.

(b) 4,4-dimethyl - 20 - oxo-5-pregneno[2.3-d]isoxazole was prepared from 2-hydroxymethylene-4,4-dimethyl-5-pregnene-3,20-dione 20-monoethylene glycol ketal and hydroxylamine hydrochloride according to the manipulative procedure described above in Example 1, part (b), followed by cleavage of the ketal group by heating with dilute ethanolic hydrochloric acid. The product was obtained in the form of colorless crystals, M.P. 161.2–163.8° C. (corr.) when recrystallized from ethylene acetate, $[\alpha]_D^{25}=+31.6°$ (1% in colorform).

Analysis.—Calcd. for C$_{24}$H$_{33}$NO$_2$: C, 78.43; H, 9.05; N, 3.81. Found: C, 78.34; H, 8.92; N, 3.82.

Example 86

17β - hydroxy - 17α - methyl - 1,3,5 - estratrieno[2.3-d]-isoxazole can be prepared by heating 17β-hydroxy-17α-methyl-19-nor-4-androsteno[2.3-d]isoxazole (Example 81) with palladium catalyst; or by bromination of the latter compound at the 10-position by means of N-bromosuccinimide, followed by dehydrobromination by heating with collidine or with lithium chloride in dimethylformamide solution.

The following compounds can also be prepared by the procedures descriped hereinabove:

Example 87

7α - acetylthio - 17α - (β - carboxyethyl) - 17β - hydroxy-4-androsteno[2.3-d]isoxazole 17-lacetone from 3-(3 - oxo - 7α - acetylthio - 17β - hydroxy - 4 - androsten-17α-yl)-propionic acid lactone.

Example 88

18 - formyl - 11β,21 - dihydroxy - 20 - oxo - 4 - pregneno[2.3-d]-isoxazole 11,18-lactol from aldosterone.

Example 89

6α-fluoro-20-oxo-4-pregneno[2.3-d]isoxazole from 6α-fluoro-4-pregnene-3,20-dione.

Example 90

6-fluoro-20-oxo-4,6-pregnadieno[2.3-d]isoxazole from 6-fluoro-4,6-pregnadiene-3,20-dione.

Example 91

17α - methyl - 17β - hydroxy - 19 - nor - 4,9 - androstadieno[2.3-d]isoxazole from 17α-methyl-19-nor-4,9-androstadien-17β-ol-3-one.

Example 92

7β,17α - dimethyl - 17β - hydroxy - 4 - androsteno[2.3-d]isoxazole from 7β,17α-dimethyl-4-androsten-17β-ol-3-one (7β,17α-dimethyltestosterone).

Example 93

5 - methyl - 11β,17α,21 - trihydroxy - 20 - oxopregnano-[2.3-d]isoxazole from 5-methyl-17α,20;20,21-bismethylenedioxypregnan-11β-ol-3-one.

Example 94

10α - methyl - 9β - H - 20 - oxo - 19 - nor - 4,6 - pregnadieno[2.3-d]isoxazole from 10α-methyl-9β-H-19-nor-4,6-pregnadiene-3,20-dione.

Example 95

10α - methyl - 9β - H - 17β - hydroxy - 19 - nor - 4,6-androstadieno[2.3-d]isoxazole from 10α-methyl-9β-H-19-nor-4,6-androstadien-17β-ol-3-one.

Also within the purview of the invention are isoxazole derivatives of D-homosteroids. The following such compounds can be prepared by procedures analogous to those described hereinabove:

Example 96

17α-oxa-17-oxo-D-homo-4-androsteno [2.3-d] isoxazole from testololactone.

Example 97

20-oxo-D-homo-4-pregneno[2.3-d]isoxazole from D-homo-4-pregnene-3,20-dione (D-homoprogresterone).

Example 98

17β-hydroxy-D - homo - 4 - androsteno[2.3-d]isoxazole from D-homo-4-androsten-17β-ol-3-one (D-homotestosterone).

Example 99

17α-methyl-17β - hydroxy-D-homoandrostano[2.3-d]isoxazole from 17α-methyl-D-homoandrostan-17β-ol-3-one.

Example 100

17-hydroxy-(1,3)androstadieno[2.3-d]-3'- methylisoxazole can be prepared from 2-acetylandrostan-17β-ol-3-one (Example 12(b)) by brominating the latter with bromine in pyridine to give the 2-bromo derivative, M.P. 119.0–121.0° C. (corr.). $[\alpha]_D^{25}=+163.8°$ (1% in chloroform), dehydrobrominating the latter with collidine to give 2-acetyl-1-androsten-17β-ol-3-one, followed by reaction with hydroxylamine in the usual manner.

This application is a continuation-in-part of our prior copending application, Serial No. 750,289, filed July 23, 1958, now abandoned.

We claim:
1. A steroido[2.3-d]isoxazole, the steroid moiety having from seventeen to about twenty-three carbon atoms exclusive of ester radicals and being selected from the group consisting of the estrane, 18-norestrane, androstane, etiocholane, pregnane and allopregnane series.

2. A compound selected from the group consisting of (A) compounds having the formula

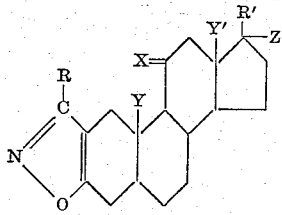

wherein R represents a member of the group consisting of hydrogen and lower-alkyl radicals; R' represents a member of the group consisting of hydrogen, lower-alkyl radicals, lower-alkenyl radicals, lower-alkynyl radicals, the acetyl radical, the hydroxyacetyl radical, the 1,2-dihydroxylethyl radical and the 1-hydroxyethyl radical; X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R' represents a member of the group consisting of hydrogen, lower-alkyl, lower-alkenyl and lower-alkynyl radicals; (B) carboxylic acid esters thereof derived from carboxylic acids having from one to about ten carbon atoms and having a molecular weight less than about 250; (C) acid-addition salts thereof; and (D) quaternary ammonium salts thereof.

3. A compound selected from the group consisting of (A) compounds having the formula

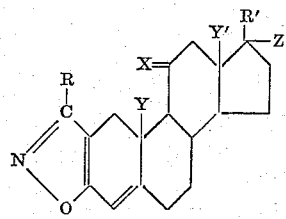

wherein R represents a member of the group consisting of hydrogen and lower-alkyl radicals; R' represents a member of the group consisting of hydrogen, lower-alkyl radicals, lower-alkenyl radicals, lower-alkynyl radicals, the acetyl radical, the hydroxyacetyl radical, the 1,2-dihydroxylethyl radical and the 1-hydroxyethyl radical; X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R' represents a member of the group consisting of hydrogen, lower-alkyl, lower-alkenyl and lower-alkynyl radicals; (B) carboxylic acid esters thereof derived from carboxylic acids having from one to about ten carbon atoms and having a molecular weight less than about 250; (C) acid-addition salts thereof; and (D) quaternary ammonium salts thereof.

4. A compound selected from the group consisting of (A) compounds having the formula

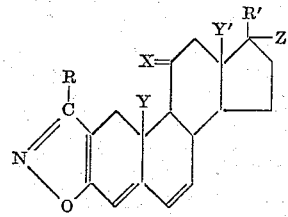

wherein R represents a member of the group consisting of hydrogen and lower-alkyl radicals; R' represents a member of the group consisting of hydrogen, lower-alkyl radicals, lower-alkenyl radicals, lower-alkynyl radicals, the acetyl radical, the hydroxyacetyl radical, the 1,2-dihydroxylethyl radical and the 1-hydroxyethyl radical; X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R' represents a member of the group consisting of hydrogen, lower-alkyl, lower-alkenyl and lower-alkynyl radicals; (B) carboxylic acid esters thereof derived from carboxylic acids having from one to about ten carbon atoms and having a molecular weight less than about 250; (C) acid-addition salts thereof; and (D) quaternary ammonium salts thereof.

5. A 17β-substituted androst-4-eno(2,3-d)-isoxazole represented by the formula

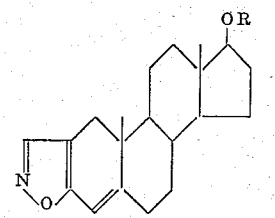

wherein R represents a member of the group consisting of hydrogen and the alkanoyl radicals of lower hydrocarbon carboxylic acids.

6. 17β-hydroxy-17α-methyl-4-androsteno[2.3-d]-isoxazole.

7. 17β-propionoxy-4-androsteno[2.3-d]isoxazole.

8. 17β-hydroxy-17α-methylandrostano[2.3-d]isoxazole.

9. 17β-hydroxy-4,4,17α-trimethyl-5-androsteno[2.3-d]-isoxazole.

10. 17β-hydroxy-17α-methyl-19-norandrostano[2.3-d]-isoxazole.

11. 17β-acetoxyandrostano[2.3-d]-isoxazole.

12. 17β-acetoxy-4,6-androstadieno[2.3-d]isoxazole.

13. 17β-hydroxy-4,6-androstadieno[2.3-d]isoxazole.

14. 17β-hydroxy-17α-methyl-4,6-androstadieno[2.3-d]-isoxazole.

15. 17α-ethynyl-17β-hydroxy-4-androsteno[2.3-d]isoxazole.

16. 20-oxo-4-pregneno[2.3-d]isoxazole.

17. 6α,17α-dimethyl-17β-hydroxy-4-androsteno[2.3-d]-isoxazole.

18. 17β-hydroxy- 17α - ethynylandrostano[2.3-d]isoxazole.

19. 17α-allyl-17β-hydroxy - 4 - androsteno[2.3-d]isoxazole.

20. 17β-hydroxyandrostano[2.3-d]isoxazole.

21. 17β-hydroxy-17α - propynyl-4-androsteno[2.3-d]isoxazole.

22. 17β-hydroxy-17α- methyl-19-nor-4-androsteno[2.3-d]isoxazole.

23. 17β-(3-cyclohexylpropionoxy)androstano[2.3-d]isoxazole.

24. 17β-hydroxy-4-androsteno[2.3-d]isoxazole.

25. 17β-(4-chlorophenoxyacetoxy)-4 - androsteno[2.3-d]isoxazole.

26. 17β-(4-chlorophenoxyacetoxy)androstano[2.3-d]isoxazole.

27. 11β,17α,21-trihydroxy-20-oxo-4-pregneno[2.3-d]isoxazole.

28. The process for preparing an isoxazole compound fused through its 4- and 5-positions to the 2- and 3-positions, respectively, of a steroid nucleus, which comprises reacting a 2-(1-hydroxyalkylidene)-3-oxo-steroid with a member of the group consisting of hydroxylamine and acid-addition salts thereof, the steroid moiety having from seventeen to about twenty-three carbon atoms exclusive of ester radicals and being selected from the group consisting of the estrane, 18-norestrane, androstane, etiocholane, pregnane and allopregnane series.

29. The process for preparing a compound selected from the group consisting of (A) compounds having the formula

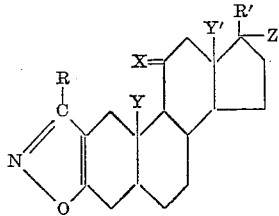

wherein R represents a member of the group consisting of hydrogen and lower-alkyl radicals; R' represents a member of the group consisting of hydrogen, lower-alkyl radicals, lower-alkenyl radicals, lower-alkynyl radicals, ketalized acetyl radicals, ketalized hydroxyacetyl radicals, the 1,2-dihydroxyethyl radical and the 1-hydroxyethyl radical; X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R' represents a member of the group consisting of hydrogen, lower-alkyl, lower-alkenyl and lower-alkynyl radicals; and (B) carboxylic acid esters thereof derived from carboxylic acids having from one to about ten carbon atoms and having a molecular weight less than about 250, which comprises reacting a compound having the formula

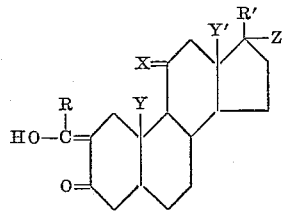

wherein R, R', X, Z, Y and Y' are identical with their selection above, with a member of the group consisting of hydroxylamine and acid-addition salts thereof in the absence of a strong acid.

30. The process for preparing a compound selected from the group consisting of (A) compounds having the formula

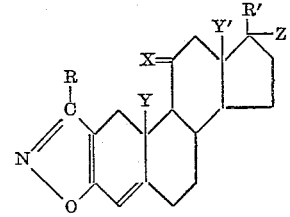

wherein R represents a member of the group consisting of hydrogen and lower-alkyl radicals; R' represents a member of the group consisting of hydrogen, lower-alkyl radicals, lower-alkenyl radicals, lower-alkynyl radicals, ketalized acetyl radicals, ketalized hydroxyacetyl radicals, the 1,2-dihydroxyethyl radical and the 1-hydroxyethyl radical; X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R' represents a member of the group consisting of hydrogen, lower-alkyl, lower-alkenyl and lower-alkynyl radicals; and (B) carboxylic acid esters thereof derived from carboxylic acids having from one to about ten carbon atoms and having a molecular weight less than about 250, which comprises reacting a compound having the formula

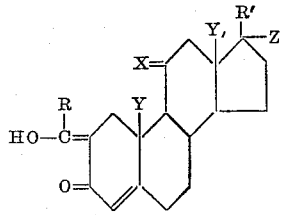

wherein R, R', X, Z, Y and Y' are identical with their selection above, with a member of the group consisting of hydroxylamine and acid-addition salts thereof in the absence of a strong acid.

31. The process for preparing a compound selected from the group consisting of (A) compounds having the formula

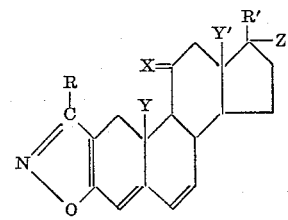

wherein R represents a member of the group consisting of hydrogen and lower-alkyl radicals; R' represents a member of the group consisting of hydrogen, lower-alkyl radicals, lower-alkenyl radicals, lower-alkynyl radicals, ketalized acetyl radicals, ketalized hydroxyacetyl radicals, the 1,2-dihydroxyethyl radical and the 1-hydroxyethyl radical; X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R' represents a member of the group consisting of hydrogen, lower-alkyl, lower-alkenyl and lower-alkynyl radicals; and (B) carboxylic acid esters thereof derived from carboxylic acids having from one to about ten carbon atoms and having a molecular weight less than about 250, which comprises reacting a compound having the formula

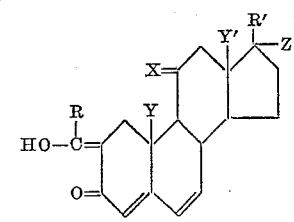

wherein R, R', X, Z, Y and Y' are identical with their selection above, with a member of the group consisting of hydroxylamine and acid-addition salts thereof in the absence of a strong acid.

32. The process for preparing 17β-hydroxy-17α-methyl-4-androsteno[2.3-d]isoxazole which comprises reacting 2-hydroxymethylene - 17α - methylandrostan-17β-ol-3-one with a member of the group consisting of hydroxylamine and acid-addition salts thereof in the absence of a strong acid.

References Cited in the file of this patent
UNITED STATES PATENTS

| | | |
|---|---|---|
| 3,035,068 | Bowers et al. | May 15, 1962 |
| 3,052,693 | Engelfried et al. | Sept. 4, 1962 |
| 3,063,990 | Kuehne | Nov. 13, 1962 |
| 3,100,771 | Manson | Aug. 13, 1963 |

UNITED STATES PATENT OFFICE
CERTIFICATE OF CORRECTION

Patent No. 3,135,743　　　　　　　　　　　　　　　　June 2, 1964

Raymond O. Clinton et al.

It is hereby certified that error appears in the above numbered patent requiring correction and that the said Letters Patent should read as corrected below.

Column 2, lines 31 to 39, formula (II) should appear as shown below instead of as in the patent:

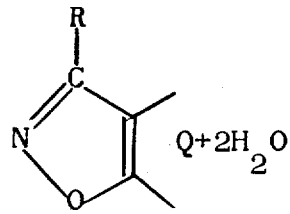

column 4, lines 9 to 20, the lower left-hand portion of formula (VIII) should appear as shown below instead of as in the patent:

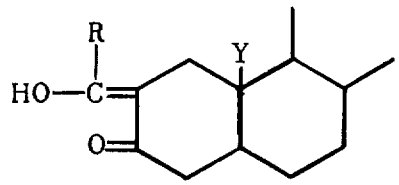

column 9, line 73, for "$C_{21}H_{41}NO_3$" read -- $C_{29}H_{41}NO_3$ --; column 10, lines 41 and 42, strike out "ethyl acetate, and the ethyl acetate extracts were washed with"; column 11, line 63, for "N, 9.15" read -- H, 9.15 --; column 13, line 16, for "1-toluenesulfonic" read -- p-toluenesulfonic --; column 14, line 41, for "2α-cyandrostan-" read -- 2α-cyanoandrostan- --;

3,135,743 lines 43 and 44, for "17β-hydroxystano[2.3-d]isoxazole", in italics, read -- 17β-hydroxyandrostano[2.3-d]isoxazole --, in italics; column 21, line 71, for "-androstan-" read -- -androsten- --; column 29, line 16, for "17β-methyl-" read -- 17α-methyl- --; line 38, for "androstan-" read -- androsten- --; column 30, line 15, for "-androstan-" read -- -androsten- --; column 32, line 74, for "-11β,17α-", in italics, read -- 11β,17α,21- --, in italics; column 33, line 54, for "ethylene" read -- ethyl --.

Signed and sealed this 6th day of April 1965.

(SEAL)
Attest:

ERNEST W. SWIDER
Attesting Officer

EDWARD J. BRENNER
Commissioner of Patents